US010822485B2

(12) United States Patent
Nojima et al.

(10) Patent No.: US 10,822,485 B2
(45) Date of Patent: Nov. 3, 2020

(54) RESIN COMPOSITION, HEAT SEALING AGENT, FILM FOR LIQUID PACKAGING CONTAINER, LIQUID PACKAGING CONTAINER, LIQUID DISCHARGE MEMBER, AND MEDICAL CONTAINER

(71) Applicant: KURARAY CO., LTD., Kurashiki (JP)

(72) Inventors: Yusuke Nojima, Kamisu (JP); Hajime Takagi, Kamisu (JP); Shinya Oshita, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 38 days.

(21) Appl. No.: 16/084,535

(22) PCT Filed: Mar. 16, 2017

(86) PCT No.: PCT/JP2017/010715
§ 371 (c)(1),
(2) Date: Sep. 12, 2018

(87) PCT Pub. No.: WO2017/159800
PCT Pub. Date: Sep. 21, 2017

(65) Prior Publication Data
US 2019/0077947 A1  Mar. 14, 2019

(30) Foreign Application Priority Data
Mar. 16, 2016 (JP) .................. 2016-053153

(51) Int. Cl.
*C08L 23/10* (2006.01)
*C08L 53/02* (2006.01)
(Continued)

(52) U.S. Cl.
CPC ................. *C08L 23/16* (2013.01); *A61J 1/10* (2013.01); *B32B 27/00* (2013.01); *B32B 27/32* (2013.01);
(Continued)

(58) Field of Classification Search
CPC .......... C08L 23/10; C08L 23/12; C08L 23/16; C08L 53/02
See application file for complete search history.

(56) References Cited

U.S. PATENT DOCUMENTS 6,977,105 B1 * 12/2005 Fujieda ................. A61L 29/126
428/36.9
9,662,270 B2 * 5/2017 Nojima ...................... C08J 5/18
(Continued)

FOREIGN PATENT DOCUMENTS

EP  3 095 808 A1  11/2016
JP  2001-1432 A  1/2001
(Continued)

OTHER PUBLICATIONS

JSR DYNARON® Hydrogenated Polymer, available online at http://jsr-nv.savvybyte.com/docs/LS%20Data%20Sheet%20Dynaron.PDF.*
(Continued)

*Primary Examiner* — Vu A Nguyen
(74) *Attorney, Agent, or Firm* — Oblon, McClelland, Maier & Neustadt, L.L.P.

(57) ABSTRACT

Described herein is a resin composition capable of giving a liquid-packaging container satisfying both high flexibility and low-temperature impact resistance, excellent in low-temperature heat seal strength an also excellent in bag-breakage strength; a heat sealing agent and a film for liquid-packaging container containing the resin composition; a liquid-packaging container formed of the film for liquid-packaging container; a liquid-packaging container and a liquid discharge member obtained using the resin composition; and a medical container having the liquid-packaging container.

21 Claims, 3 Drawing Sheets

(51) Int. Cl.
  *B32B 27/32* (2006.01)
  *B65D 65/40* (2006.01)
  *A61J 1/10* (2006.01)
  *C08L 23/16* (2006.01)
  *B65D 75/58* (2006.01)
  *B32B 27/00* (2006.01)
  *C08L 23/12* (2006.01)

(52) U.S. Cl.
  CPC ............ *B65D 65/40* (2013.01); *B65D 75/58* (2013.01); *C08L 23/10* (2013.01); *C08L 23/12* (2013.01); *C08L 53/02* (2013.01); *C08L 2203/162* (2013.01)

(56) References Cited

U.S. PATENT DOCUMENTS

| | | |
|---|---|---|
| 2006/0100380 A1 | 5/2006 | Kakarala et al. |
| 2007/0276094 A1 | 11/2007 | Kakarala et al. |
| 2011/0319837 A1 | 12/2011 | Uehara et al. |
| 2012/0157631 A1 | 6/2012 | Tsou et al. |
| 2016/0326412 A1 | 11/2016 | Hoshina et al. |

FOREIGN PATENT DOCUMENTS

| | | |
|---|---|---|
| JP | 2002-36433 A | 5/2002 |
| JP | 2004-250682 A | 9/2004 |
| JP | 2009-149861 A | 7/2009 |
| JP | 2010-106200 A | 5/2010 |
| JP | 2013-122055 A | 6/2013 |
| WO | WO 2010/104066 A1 | 9/2010 |
| WO | WO 2015/098664 A1 | 7/2015 |
| WO | WO 2015/156334 A1 | 10/2015 |

OTHER PUBLICATIONS

Otsuka et al., Polymer vol. 39, No. 8-9, pp. 1533-1538, 1998.*
International Search Report dated May 30, 2017, in PCT/JP2017/010715 filed Mar. 16, 2017.
Extended European Search Report dated Dec. 11, 2019 in European Patent Application No. 17766796.1, 8 pages.

* cited by examiner

RESIN COMPOSITION, HEAT SEALING AGENT, FILM FOR LIQUID PACKAGING CONTAINER, LIQUID PACKAGING CONTAINER, LIQUID DISCHARGE MEMBER, AND MEDICAL CONTAINER

TECHNICAL FIELD

The present invention relates to a resin composition, a heat sealing agent, a film for liquid-packaging container, a liquid-packaging container, a liquid discharge member, and a medical container.

BACKGROUND ART

As a liquid-packaging container for medical use, for example, as an infusion bag, glass-made or plastic-made ones are used. A liquid medicine injected in an infusion bag is, after sealed up, generally sterilized according to a method of steam sterilization or autoclave sterilization. Glass-made ones are problematic in that they are heavier than plastic-made ones and are readily broken when given impact or dropped during transportation, and therefore, plastic-made infusion bags are widely used.

As plastic-made infusion bags, those made of a soft vinyl chloride resin, or those made of a polyolefin such as polyethylene or polypropylene are used. However, an infusion bag made of a soft vinyl chloride resin contains a large amount of a plasticizer so as to be given elasticity, and therefore, depending on the type of the infusion solution to be therein, the plasticizer may be released into the infusion solution This is pointed out as problematic from a view point of safety. In addition, medical tools are thrown away after use, and therefore soft vinyl chloride resin-made infusion bags are incinerated after use, but there occurs another problem of toxic gas generation owing to the soft vinyl chloride resin. On the other hand, polyolefin-made infusion bags do not contain a plasticizer, and are favorable form a hygiene standpoint, but polyethylene-made ones are poor in heat resistance during sterilization treatment though excellent in flexibility, while polypropylene-made ones have low flexibility and insufficient impact resistance though excellent in heat resistance during sterilization treatment, and for these reasons, these could not be said to be sufficient in point of handleability.

Hence, for the purpose of improving flexibility, sealing performance and antiblocking performance, a multilayer film for medical use has been proposed, which uses a sealing layer (inner layer) of a polypropylene-based resin composition containing 50 to 98% by mass of a crystalline polypropylene-based resin, 1 to 49% by mass of a specific ethylene-α-olefin copolymer and 1 to 49% by mass of a specific hydrogenated block copolymer (see PTL 1). In Examples of PTL 1, the content of the ethylene-α-olefin copolymer is set to be 5% by mass or less with no exception, but when the polypropylene-based resin composition where the content of the ethylene-α-olefin copolymer is at such a level is used as a material for the middle layer of a medical container such as an infusion bag, there occur a problem that the liquid-packaging container is readily broken when given an impact or when dropped, and the material of the sealing layer (inner layer) used in Examples of PTL 1 has a problem to provide a high probability of inner layer agglutination. Consequently, previously, the present inventors have proposed to use a resin composition containing 100 parts by mass of a specific polypropylene-based resin (1), 5 to 95 parts by mass of a specific thermoplastic elastomer (2) and 10 to 95 parts by mass of a specific ethylene-α-olefin copolymer (3) as a middle layer of a liquid-packaging container, for the purpose of providing a liquid-packaging container having good flexibility, transparency, high heat-sealing strength, high bag-breakage strength at low temperature (for example, at −10° C. to 10° C. or so) and room temperature (for example, at 15° C. to 30° C. or so), and resistance to inner layer agglutination (see PTL 2).

CITATION LIST

Patent Literature

PTL 1: P 2009-149861A
PTL 2: WO2015/156334

SUMMARY OF INVENTION

Technical Problem

Further investigations made by the present inventors have clarified that the liquid-packaging container described in PTL 2 could surely solve the above-mentioned problems, but it is not easy to satisfy both flexibility and low-temperature impact resistance important in transportation in cold climates at a high level, and when flexibility is tried to be increased, low-temperature impact resistance tends to be insufficient, and when low-temperature impact resistance is tried to be increased, flexibility tends to be insufficient.

On the other hand, a liquid discharge member to be fixed to a liquid-packaging container is fixed to a liquid-packaging container by heat-sealing thereto at a high temperature, but it has been found that when the heat-sealing temperature is high, the liquid-packaging container tends to be thin-walled, and owing to this, the bag-breakage strength of the container lowers. Consequently, apart from the development of materials for liquid-packaging containers, it is desired to develop a material for a liquid discharge member that has a high heat-sealing strength even when the heat-sealing temperature thereof is lowered.

Given the situation, the subject matter of the present invention is to provide a resin composition capable of satisfying both high flexibility and low-temperature impact resistance, excellent in a low-temperature heat-sealing strength and also excellent in a bag-breakage strength, to provide a heat sealing agent and a film for liquid-packaging container containing the resin composition, and to provide a liquid-packaging container formed of the film for liquid-packaging container, a liquid-packaging container and a liquid discharge member formed using the resin composition, and a medical container having the liquid-packaging container.

Solution to Problem

As a result of assiduous studies, the present inventors have found that a resin composition, which contains a polypropylene-based resin (a) and a hydrogenated block copolymer (b) having a specific glass transition temperature and which, when the polypropylene-based resin (a) is an adherend and the hydrogenated block copolymer (b) is an adhesive layer, has a tensile shear adhesion strength of a predetermined value or more, can solve the above-mentioned problems, and have thus reached the present invention.

The present invention relates to the following [1] to [24].

[1] A resin composition containing a polypropylene-based resin (a) and a hydrogenated block copolymer (b), wherein:

the hydrogenated block copolymer (b) is a hydrogenation product of a block copolymer containing a polymer block (A) mainly containing a structural unit derived from an aromatic vinyl compound and a polymer block (B) mainly containing a structural unit derived from isoprene, a structural unit derived from butadiene, or a structural unit derived from a mixture of isoprene and butadiene, the glass transition temperature of the hydrogenated block copolymer (b) is −50 to −35° C., and the tensile shear adhesion strength, as obtained by a measurement according to JIS K 6850 (1999) where the polypropylene-based resin (a) is an adherend and the hydrogenated block copolymer (b) is an adhesive layer, is 1.0 MPa or more.

[2] The resin composition according to the above [1], which satisfies the following expression (1):

$$2.5° C. \leq |tp(a) - tp(ab)| \leq 12° C. \tag{1}$$

wherein tp(a) represents a tan δ peak top temperature (° C.) derived from a polypropylene-based resin (a) in the case of the polypropylene-based resin (a) alone, and tp(ab) represents a tan δ peak top temperature (° C.) derived from a polypropylene-based resin (a) in the case of the resin composition of the polypropylene-based resin (a) and the hydrogenated block copolymer (b) only as kneaded in a ratio (by mass) of polypropylene-based resin (a)/hydrogenated block copolymer (b)=70/30.

[3] The resin composition according to the above [1] or [2], wherein the content ratio of the polypropylene-based resin (a) relative to the total of the polypropylene-based resin (a) and the hydrogenated block copolymer (b) [(a)/{(a)+(b)}] (by mass) is 50/100 to 95/100.

[4] The resin composition according to any of the above [1] to [3], wherein the polypropylene-based resin (a) forms a continuous phase and the hydrogenated block copolymer (b) forms an island-like disperse phase, and in the islands that form the disperse phase, there exist islands having a length in the major axis direction of 500 nm or more.

[5] The resin composition according to any of the above [1] to [4], further containing a hydrogenated block copolymer (b') which is a hydrogenation product of a block copolymer containing a polymer block (A') that mainly contains a structural unit derived from an aromatic vinyl compound, and a polymer block (B') that mainly contains a structural unit derived from isoprene, a structural unit derived from butadiene or a structural unit derived from a mixture of isoprene and butadiene, and which has a glass transition temperature of −60° C. or higher and lower than −50° C., or higher than −35° C. and −5° C. or lower.

[6] The resin composition according to any of the above [1] to [5], wherein the content of the polymer block (A) in the hydrogenated block copolymer (b) is from 3 to 35% by mass.

[7] The resin composition according to any of the above [1] to [6], wherein the hydrogenation rate of the hydrogenated block copolymer (b) is 80 mol % or more.

[8] The resin composition according to any of the above [1] to [7], wherein the weight average molecular weight of the hydrogenated block copolymer (b) is from 20,000 to 500,000.

[9] The resin composition according to any of the above [1] to [8], wherein the polymer block (B) mainly contains a structural unit derived from butadiene, or a structural unit derived from a mixture of isoprene and butadiene.

[10] The resin composition according to any of the above [1] to [9], wherein the polypropylene-based resin (a) contains a propylene-derived structural unit in an amount of 60 mol % or more, and has a melt flow rate at 230° C. and under the condition of a load 21.6 N of 0.1 to 70 g/10 min.

[11] The resin composition according to any of the above [1] to [10], wherein the polypropylene-based resin (a) is at least one selected from the group consisting of a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and denatured derivatives thereof.

[12] The resin composition according to any of the above [1] to [1], which has a Young's modulus of 650 MPa or less.

[13] A heat sealing agent, containing the resin composition of any of the above [1] to [12].

[14] A film for liquid-packaging container, containing the resin composition of any of the above [1] to [12].

[15] A liquid-packaging container, which is formed of the film for liquid-packaging container of the above [14].

[16] A liquid-packaging container, including a laminate of two or more layers having an inner layer and an outer layer, wherein:

the inner layer contains the resin composition of any of the above [1] to [12], and the outer layer contains a resin composition (Y) containing a polypropylene-based resin having a propylene-derived structural unit content of 60 mol % or more, in an amount of 55% by mass or more.

[17] A liquid-packaging container, including a laminate of three or more layers having a middle layer between an inner layer and an outer layer, wherein:

at least one selected from the group consisting of the inner layer and the middle layer contains the resin composition of any of the above [1] to [12], and the outer layer contains a resin composition (Y) containing a polypropylene-based resin having a propylene-derived structural unit content of 60 mol % or more, in an amount of 55% by mass or more.

[18] A liquid-packaging container, including a laminate of two or more layers having an inner layer and an outer layer, wherein at least one selected from the group consisting of the inner layer and the outer layer contains the resin composition of any of the above [1] to [12].

[19] A liquid-packaging container, including a laminate of three or more layers having a middle layer between an inner layer and an outer layer, wherein the outer layer contains the resin composition of any of the above [1] to [12].

[20] The liquid-packaging container according to the above [16] or [17], wherein the resin composition (Y) contains a hydrogenated block copolymer (b') which is a hydrogenation product of a block copolymer containing a polymer block (A') that mainly contains a structural unit derived from an aromatic vinyl compound, and a polymer block (B') that mainly contains a structural unit derived from isoprene, a structural unit derived from butadiene or a structural unit derived from a mixture of isoprene and butadiene, and which has a glass transition temperature of −60° C. or higher and lower than −50° C., or higher than −35° C. and −5° C. or lower.

[21] The liquid-packaging container according to the above [17] or [19], wherein the thickness of each layer is from 5 to 50 μm for the inner layer, from 100 to 300 μm for the middle layer and from 10 to 120 μm for the outer layer.

[22] A liquid discharge member, containing the resin composition of any of the above [1] to [12].

[23] The liquid-packaging container according to any of the above [15] to [21], which is equipped with the liquid discharge member of the above [20].

[24] A medical container having the liquid-packaging container of any of the above [15] to [21] and [23]

Advantageous Effects of Invention

According to the present invention, there is provided a resin composition capable of giving a liquid-packaging container that satisfies both high flexibility and low-temperature impact resistance and is excellent in a low-temperature heat-sealing strength and also in a bag-breakage strength (especially a bag-breakage strength at a low temperature). In addition, there also provided a heat-sealing agent and a film for liquid-packaging container that contain the resin composition, a liquid-packaging container formed of the film for liquid-packaging container, a liquid-packaging container and a liquid discharge member formed using the resin composition, and a medical container having the liquid-packaging container.

DESCRIPTION OF EMBODIMENTS

Figure 1:
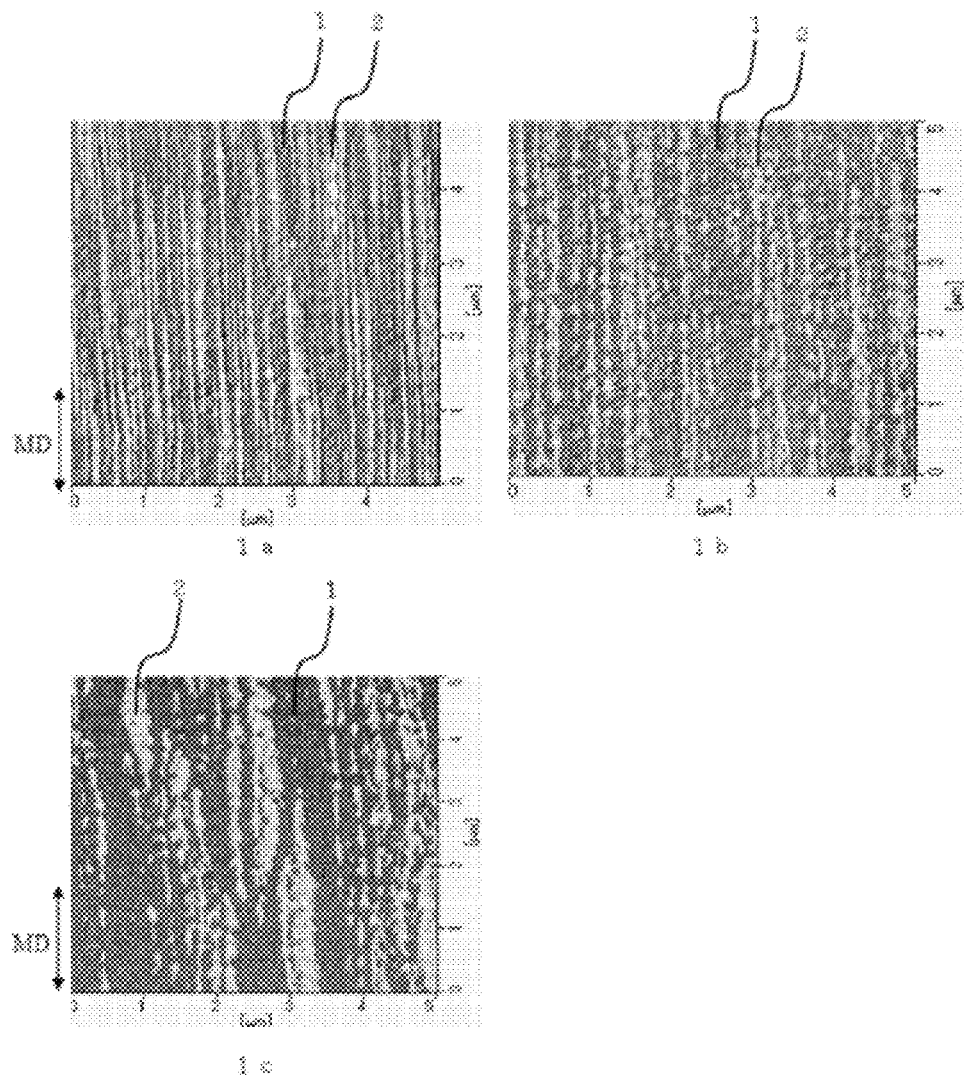
FIG. 1 shows images of phase structures of a film for liquid-packaging container as observed with a scanning probe microscope (SPM), each corresponding to the morphology evaluation A in Examples.

In this description, a preferred definition may be selected in any desired manner, and a combination of preferred definitions can be said to be more preferred. Any desired number of choices may be selected from preferred choices.

[Resin Composition]

The present invention is a resin composition containing a polypropylene-based resin (a) and a hydrogenated block copolymer (b), wherein:

the hydrogenated block copolymer (b) is a hydrogenation product of a block copolymer containing a polymer block (A) mainly containing a structural unit derived from an aromatic vinyl compound and a polymer block (B) mainly containing a structural unit derived from isoprene, a structural unit derived from butadiene, or a structural unit derived from a mixture of isoprene and butadiene, the glass transition temperature of the hydrogenated block copolymer (b) is −50 to −35° C., and the tensile shear adhesion strength, as obtained by a measurement according to JIS K 6850 (1999) where the polypropylene-based resin (a) is an adherend and the hydrogenated block copolymer (b) is an adhesive layer, is 1.0 MPa or more.

The constituent component of the resin composition of the present invention are described in order.

[Polypropylene-Based Resin (a)]

The polypropylene-based resin (a) is not specifically limited so far as the content of the structural unit derived from propylene (hereinafter this may be abbreviated as a propylene unit) is 60 mol % or more, and any known polypropylene-based resin is usable. The propylene unit content is preferably 80 mol % or more, more preferably 80 to 100 mol %, even more preferably 90 to 100 mol %, and especially preferably 95 to 99 mol %. Examples of the structural unit derived from any other than propylene include a structural unit derived from ethylene, a structural unit derived from an α-olefin such as 1-butene, 1-hexene, 1-heptene, 1-octene, 4-methyl-1-pentene, 1-nonene, and 1-decene, and a structural unit derived from a denaturant to be mentioned below.

For example, the polypropylene-based resin (a) is preferably at least one selected from the group consisting of a homopolypropylene, a propylene-ethylene random copolymer, a propylene-ethylene block copolymer, a propylene-butene random copolymer, a propylene-ethylene-butane random copolymer, a propylene-pentene random copolymer, a propylene-hexene random copolymer, a propylene-octene random copolymer, a propylene-ethylene-pentene random copolymer, a propylene-ethylene-hexane random copolymer, and denatured derivatives thereof. The denatured derivatives include those obtained through graft copolymerization of a polypropylene-based resin with a denaturant and those obtained through copolymerization of a polypropylene-based resin with a denaturant at the main chain thereof. Examples of the denaturant include unsaturated dicarboxylic acids such as maleic acid, citraconic acid, halogenomaleic acid, itaconic acid, cis-4-cyclohexene-1,2-dicarboxylic acid, and endo-cis-bicyclo[2.2.1]-5-heptene-2,3-dicarboxylic acid; esters, amides or imides of unsaturated dicarboxylic acids; unsaturated dicarboxylic acid anhydrides such as maleic anhydride, citraconic anhydride, halogenomaleic anhydride, itaconic anhydride, cis-4-cyclohexene-1,2-dicarboxylic acid anhydride, and endo-cis-bicyclo[2.2.1]-5-heptene-2,3-dicarboxylic acid anhydride; unsaturated monocarboxylic acids such as acrylic acid, methacrylic acid, and crotonic acid; esters of unsaturated monocarboxylic acids (methyl acrylate, ethyl acrylate, methyl methacrylate, ethyl methacrylate, etc.), and amides or imides thereof. The polypropylene-based resin (a) is preferably a non-denatured one.

Above all, from the viewpoint of relatively low cost and easy availability, a homopolypropylene, a propylene-ethylene random copolymer, and a propylene-ethylene block copolymer are preferred, a homopolypropylene and a propylene-ethylene random copolymer are more preferred, and a propylene-ethylene random copolymer is even more preferred.

The polypropylene-based resin (a) may be used singly, or two or more kinds thereof may be used in combination.

Preferably, the melt flow rate (MFR) of the polypropylene-based resin (a) under the condition at 230° C. and 21.6 N is 0.1 to 70 g/10 min, more preferably 1 to 30 g/10 min, and in particular, in the case of extrusion molding, from the viewpoint of moldability of the resin composition, the melt flow rate is preferably 0.1 to 30 g/10 min, more preferably 1 to 20 g/10 min, even more preferably 1 to 1.0 g/min, in the case of injection molding, from the viewpoint of moldability of the resin composition, the melt flow rate is preferably 1 to 70 g/10 min, more preferably 1 to 60 g/10 min, even more preferably 1 to 30 g/10 min. The "melt flow rate" described in the present description and the claims is a value measured according to JIS K 7210(1999).

The melting point of the polypropylene-based resin (a) is, though not specifically limited, preferably 120 to 180° C., more preferably 120 to 170° C. The "melting point" described in the present description and the claims is the peak top value of an endothermic peak of a sample that is measured by heating and melting the sample from 30° C. to 250° C. at a heating rate of 10° C./min, then cooling it from 250° C. to 30° C. at a cooling rate of 10° C./min, and again heating it from 30° C. to 250° C. at a heating rate of 10° C./min, using a differential scanning calorimeter (DSC) "TGA/DSC 1 Star System" (manufactured by Mettler Toledo Corporation).

[Hydrogenated Block Copolymer (b)]

The hydrogenated block copolymer (b) is a hydrogenation product of a block copolymer containing a polymer block (A) mainly containing a structural unit derived from an aromatic vinyl compound and a polymer block (B) mainly containing a structural unit derived from isoprene (isoprene unit), a structural unit derived from butadiene (butadiene unit), or a structural unit derived from a mixture of isoprene and butadiene (isoprene/butadiene unit), and the glass transition temperature (Tg) of the hydrogenated block copolymer (b) is −50 to −35° C.

In the following, the polymer block (A) and the polymer block (B) are described sequentially.

(Polymer Block (A))

The polymer block (A) mainly contains a structural unit derived from an aromatic vinyl compound. The wording "mainly contains" as referred to herein means that the polymer block (A) contains a structural unit derived from an aromatic vinyl compound in an amount of 50% by mass or more based on the total mass of the polymer block (A). The content of the structural unit derived from an aromatic vinyl compound in the polymer block (A) is, from the viewpoint of transparency and mechanical properties of the resin composition (X), more preferably 70% by mass or more based on the total mass of the polymer block (A), even more preferably 90% by mass or more, and may be 100% by mass.

Examples of the aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, 3-methyl-2,6-dimethylstyrene, f-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, silyl group-substituted styrene derivatives, indene, and vinylnaphthalene. Above all, from the viewpoint of production cost and physical property balance, styrene, α-methylstyrene, p-methylstyrene and mixtures thereof are preferred, and styrene is more preferred.

However, so far as it does not detract from the advantageous effects of the present invention, the polymer block (A) may contain a structural unit derived from any other unsaturated monomer than the aromatic vinyl compound. Examples of the other unsaturated monomer include at least one selected from butadiene, isoprene, 2,3-dimethyl-1,3-butadiene, 1,3-pentadiene, 1,3-hexadiene, isobutylene, styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, f-pinene, 8,9-p-menthene, dipentene, methylenenorbornene, 2-methylenetetrahydrofuran. The bonding mode in the case where the polymer block (A) contains a structural unit derived from the other unsaturated monomer is not specifically limited, and may be any of random or tapered modes.

In the case where the polymer block (A) contains a structural unit derived from any other unsaturated monomer than an aromatic vinyl compound, the content thereof is preferably 10% by mass or less based on the total mass of the polymer block (A).

The weight average molecular weight (Mw) of the polymer block (A) is preferably 2,500 to 100,000, more preferably 2,500 to 50,000, even more preferably 3,000 to 30,000. The "weight average molecular weight" described in the present description and the claims is all a standard polystyrene-equivalent weight average molecular weight measured through gel permeation chromatography (GPC), and is, more precisely, a value measured according to the method described in the section of Examples.

The content of the polymer block (A) is, from the viewpoint of rubber elasticity and flexibility, preferably 3 to 35% by mass, more preferably 5 to 35% by mass, even more preferably 5 to 25% by mass, especially preferably 5 to 20% by mass, and most preferably 5 to 15% by mass. The content of the polymer block (A) in the hydrogenated block copolymer (b) is a value measured through $^1$H-NMR spectrometry, and is, more precisely, a value measured according to the method described in the section of Examples.

(Polymer Block (B))

The polymer block (B) mainly contains a structural unit derived from isoprene (isoprene unit), a structural unit derived from butadiene (butadiene unit), or a structural unit derived from a mixture of isoprene and butadiene (isoprene/butadiene unit). The wording "mainly contains" as referred to herein means that the polymer block (B) contains a structural unit derived from isoprene and/or butadiene in an amount of 50% by mass or more based on the total mass of the polymer block (B). The content of the structural unit derived from isoprene and/or butadiene in the polymer block (B) is, based on the total mass of the polymer block (B), more preferably 70% by mass or more, even more preferably 90% by mass or more, and may be 100% by mass.

More preferably, the polymer block (B) mainly contain a structural unit derived from butadiene, or a structural unit derived from a mixture of isoprene and butadiene, and even more preferably mainly contains a structural unit derived from a mixture of isoprene and butadiene.

In the case where the polymer block (B) mainly contains a structural unit derived from a mixture of isoprene and butadiene, the blending ratio [isoprene/butadiene] (by mass) is not specifically limited, but is preferably 5/95 to 95/5, more preferably 10/90 to 90/10, even more preferably 40/60 to 70/30, and especially more preferably 45/55 to 65/35. The bonding mode is not specifically limited, and may be any of random, tapered, completely alternated, partially blocked or blocked modes, or a combination of two or more of them.

The weight average molecular weight of the polymer block (B) is, from the viewpoint of flexibility, preferably 10,000 to 500,000, more preferably 20,000 to 400,000, even more preferably 40,000 to 300,000, especially preferably 75,000 to 240,000, most preferably 85,000 to 220,000.

In the polymer block (B), the content of the vinyl bond structural unit (for example, in the case of a butadiene monomer, the content of the 1,2-bond structural unit, and in the case of an isoprene monomer, the total content of the 1,2-bond structural unit and the 3,4-bond structural unit) (hereinafter this may be referred to as a vinyl bond amount) is preferably 40 to 85 mol %, more preferably 40 to 80 mol %. In particular, in the case where the polymer block (B) mainly contains a structural unit derived from a mixture of isoprene and butadiene, the content is preferably 40 to 85 mol %, more preferably 40 to 80 mol %, even more preferably 45 to 60 mol %, especially preferably 45 to 58 mol %, and most preferably 47 to 57 mol %; and in the case where the polymer block (B) mainly contains a structural unit derived from butadiene, the content is preferably 40 to 80 mol %, more preferably 60 to 80 mol %, even more preferably 70 to 80 mol %, especially preferably 70 to 78 mol %, and most preferably 72 to 78 mol %. In the case where the polymer block (B) mainly contains a structural unit derived from isoprene, the content is preferably 20 to 60 mol %, more preferably 30 to 55 mol %, even more preferably 40 to 50 mol %.

From the viewpoint of heat resistance and weather resistance, preferably, 80 mol % or more of the carbon-carbon double bond that the polymer block (B) has is hydrogenated, more preferably 85 mol % or more thereof is hydrogenated, even more preferably 90 mol % or more thereof is hydrogenated, and especially preferably 93 mol % or more thereof is hydrogenated. The value may be referred to as a hydrogenation rate. Though not specifically limited, the upper limit of the hydrogenation rate may be 99 mol %, or may be 98 mol %.

The hydrogenation rate is a value of the content of the carbon-carbon double bond in the structural unit derived from the conjugated diene compound in the polymer block (B), as measured through $^1$H-NMR analysis after hydrogenation, and is, more precisely, a value determined according to the method described in the section of Examples.

Further, so far as it does not detract from the advantageous effects of the present invention, the polymer block (B) may contain a structural unit derived from any other polymerizable monomer than isoprene and butadiene. Preferred examples of the other polymerizable monomer include at least one or more compounds selected from other conjugated diene compounds than isoprene and butadiene, such as 2,3-dimethyl-1,3-butadiene, 1,3-pentadiene, and 1,3-hexadiene; aromatic vinyl compounds such as styrene, α-methylstyrene, o-methylstyrene, m-methylstyrene, p-methylstyrene, p-t-butylstyrene, 2,4-dimethylstyrene, vinylnaphthalene and vinylanthracene; and methyl methacrylate, methyl vinyl ether, N-vinylcarbazole, β-pinene, 8,9-p-menthene, dipentene, methylenenorbornene, and 2-methylenetetrahydrofuran. In the case where the polymer block (B) contains a structural unit derived from the other polymerizable monomer, the bonding form is not specifically limited, and may be any of random or tapered modes.

In the case where the polymer block (B) contains a structural unit derived from the other polymerizable monomer, the content thereof is preferably 30% by mass or less based on the total mass of the polymer block (B), more preferably 10% by mass or less, even more preferably 5% by mass or less.

(Bonding Mode of Polymer Block (A) and Polymer Block (B))

The bonding mode of the hydrogenated block copolymer (b) is not specifically limited so far as the polymer block (A) and the polymer block (B) bond therein, and may be any bonding mode of linear, branched or radial bonding or may be a bonding mode of two or more of them as combined. Above all, the bonding mode of the polymer block (A) and the polymer block (B) is preferably linear, and examples thereof include a triblock copolymer of A-B-A where the polymer block (A) is represented by A and the polymer block (B) is represented by B, a tetrablock copolymer of A-B-A-B, a pentablock copolymer of A-B-A-B-A, and an (A-B)nX copolymer (where X represents a coupling agent residue, and n represents an integer of 3 or more). Above all, a triblock copolymer (A-B-A) is preferably employed from the viewpoint of easiness in production of the hydrogenated block copolymer (b) and flexibility thereof.

Here in the present description, in the case where polymer blocks of the same kind bond linearly via a bifunctional coupling agent or the like, the bonding polymer blocks are dealt as one polymer block. According to the above, including the above-mentioned exemplifications, a polymer block that intrinsically should be technically expressed as Y-X-Y (where X represents a coupling residue) is expressed as Y as a whole excepting the case that should be differentiated from the single polymer block Y. In this description, the polymer block of this kind that contains a coupling agent residue is dealt as above, and therefore, for example, a block copolymer that contains a coupling agent residue and should be technically expressed as A-B-X-B-A (where X represents a coupling agent residue) is dealt as an example of a triblock copolymer.

In the hydrogenated copolymer (b), a polymer block (C) of any other polymerizable monomer than the polymer block (A) and the polymer block (B) may exist, within a range not detracting from the advantageous effects of the present invention. In this case, the structure of the block copolymer includes an A-B-C triblock copolymer, an A-B-C-A tetrablock copolymer, and an A-B-A-C tetrablock copolymer where the polymer block (C) is represented by C.

In the hydrogenated block copolymer (b), the total content of the polymer block (A) and the polymer block (B) is preferably 50% by mass or more, more preferably 70% by mass or more, even more preferably 80% by mass or more, especially preferably 90% by mass or more, and most preferably substantially 100% by mass.

The weight average molecular weight of the hydrogenated block copolymer (b) is preferably 20,000 to 500,000, more preferably 70,000 to 400,000, even more preferably 70,000 to 300,000, especially preferably 90,000 to 250,000, and most preferably 130,000 to 200,000. When the weight average molecular weight of the hydrogenated block copolymer (b) is 20,000 or more, the resin composition may have good heat resistance, and on the other hand, when the weight average molecular weight thereof is 500,000 or less, the resin composition may have good moldability.

The molecular weight distribution (Mw/Mn) of the hydrogenated block copolymer (b) is not specifically limited but is, from the viewpoint of the mechanical strength of the resultant resin composition, preferably 1.0 to 1.4, more preferably 1.0 to 1.2. The molecular weight distribution (Mw/Mn) is a value calculated from Mw and Mn obtained as a standard polystyrene-equivalent molecular weight through gel permeation chromatography (GPC).

So far as it does not detract from the advantageous effects of the present invention, the hydrogenated block copolymer (b) may have, in the molecular chain and/or at the molecular terminal thereof, one or more functional groups such as a carboxy group, a hydroxy group, an acid anhydride group, an amino group, and an epoxy group.

Regarding the flowability of the hydrogenated block copolymer (b), from the viewpoint of improving the moldability of the resin composition (X), the melt flow rate (MFR) of the composition measured at 230° C. and 21.6 N is preferably 0.1 to 100 g/10 min, more preferably 1 to 90 g/10 min. In particular, from the viewpoint of moldability in extrusion molding, the melt flow rate is preferably 0.1 to 80 g/10 min, more preferably 1 to 50 g/10 min. From the viewpoint of the low-temperature heat seal strength of the injection-molded article, MFR is preferably 20 to 100 g/10 min. more preferably 40 to 100 g/10 min, even more preferably 60 to 100 g/10 min.

The hydrogenated block copolymer (b) for use in the present invention is, from the viewpoint of satisfying both high flexibility and low-temperature impact resistance and attaining excellent low-temperature heat seal strength and high bag-breakage strength, a hydrogenated block copolymer having a glass transition temperature of −50 to −35° C. When the glass transition temperature of the hydrogenated block copolymer (b) falls within the above range, it is considered that the hydrogenated block copolymer (b) may have suitable affinity to the polypropylene-based resin (a), and the resin composition of the present invention can therefore have the morphology as mentioned below. In addition, it has been found that, since the hydrogenated block copolymer (b) has such a glass transition temperature as to be −50° C. to −35° C., the resin composition of the present invention may have a lowered storage modulus (E') in the supposed temperature range having some influences on low-temperature characteristics, and may have an increased internal loss (tan δ). Accordingly, it is presumed that the impact resistance at a low temperature and the bag-breakage strength at a low temperature could be improved more. In this description, the glass transition temperature of the hydrogenated block copolymer (b) means the glass transition temperature derived from the polymer block (B) that the hydrogenated block copolymer (b) has.

From the above-mentioned viewpoints, Tg of the hydrogenated block copolymer (b) is preferably −48 to −35° C., more preferably −45 to −35° C., even more preferably −45 to −37° C.

For satisfying both high flexibility and low-temperature impact resistance and attaining excellent low-temperature heat seal strength and high bag-breakage strength, it is important that the hydrogenated block copolymer (b) having Tg to fall within the above-mentioned range is used, and that the tensile shear adhesion strength, as obtained by a measurement according to JIS K 6850(1999) where the polypropylene-based resin (a) is an adherend and the hydrogenated block copolymer (b) is an adhesive layer, is 1.0 MPa or more. From the same viewpoints, the tensile shear adhesion strength is preferably 1.3 MPa or more, more preferably 1.5 MPa or more, even more preferably 1.85 MPa or more, and further more preferably 2.0 MPa or more. The upper limit of the tensile shear adhesion strength is not specifically limited, and may be 4.0 MPa, or 3.0 MPa, or 2.5 MPa.

More precisely, the tensile shear adhesion strength is one measured according to the method described in the section of Examples.

(Method for Producing Hydrogenated Block Copolymer (b))

The hydrogenated block copolymer (b) may be produced according to a solution polymerization method, an emulsion polymerization method or a solid-phase polymerization method. Above all, a solution polymerization method is preferred, and for example, any known method such as an ionic polymerization method of anionic polymerization or cationic polymerization, or a radical polymerization method is employable. Above all, an anionic polymerization method is preferred. In an anionic polymerization method, an aromatic vinyl compound and a conjugated diene compound are successively added in the presence of a solvent, an anionic polymerization initiator and optionally a Lewis base to give a block copolymer, and then the block copolymer is hydrogenated to give the hydrogenated block copolymer (b).

Examples of the organic lithium compound to be used as the polymerization initiator in the above-mentioned method include monolithium compounds such as methyl lithium, ethyl lithium, pentyl lithium, n-butyl lithium, sec-butyl lithium, and tert-butyl lithium, and dilithium compounds such as tetraethylene dilithium.

With no specific limitation, the solvent may be any one not having any negative influences on anionic polymerization reaction, and examples thereof include aliphatic hydrocarbons such as cyclohexane, methylcyclohexane, n-hexane, and n-pentane; and aromatic hydrocarbons such as benzene, toluene and xylene. The polymerization reaction is carried out generally at 0 to 100° C. for 0.5 to 50 hours.

The Lewis base has a role of controlling the microstructure of the structural unit derived from a conjugated diene compound. Examples of the Lewis base include dimethyl ether, diethyl ether, tetrahydrofuran, dioxane, ethylene glycol dimethyl ether, pyridine, N,N,N',N'-tetramethylethylenediamine, trimethylamine, and N-methylmorpholine. One of Lewis acids may be used singly or two or more kinds thereof may be used in combination.

After polymerization according to the above-mentioned method, the polymerization reaction is stopped by adding an active hydrogen compound such as alcohols, carboxylic acids and water, and according to a known method, the product is hydrogenated in the presence of a hydrogenation catalyst in an inert organic solvent to give a hydrogenated product.

The hydrogenation may be carried out in the presence of a hydrogenation catalyst at a reaction temperature of 20 to 100° C. and under a hydrogen pressure of 0.1 to 10 MPa.

Examples of the hydrogenation catalyst include Raney nickel; heterogeneous catalysts of a metal such as platinum (Pt), palladium (Pd), ruthenium (Ru), rhodium (Rh) or nickel (Ni) supported on a carrier such as carbon, alumina or diatomaceous earth; Ziegler catalysts of a combination of an organic metal compound of a Group-8 metal such as nickel or cobalt and an organic aluminum compound or an organic lithium compound such as triethylaluminum or triisobutylaluminum; and metallocene catalysts of a combination of a bis(cyclopentadienyl) compound of a transition metal such as titanium, zirconium or hafnium, and an organic metal compound of lithium, sodium, potassium, aluminum, zinc or magnesium.

The thus-produced, hydrogenated block copolymer (b) may be taken out by pouring the polymerization liquid into methanol for solidification and then heating or drying it under reduced pressure, or by pouring the polymerization liquid into boiling water to remove the solvent through azeotropy for so-called steam stripping, and then heating or drying it under reduced pressure.

(Content Ratio of Polypropylene-Based Resin (a))

The content ratio of the polypropylene-based resin (a) relative to the total of the polypropylene-based resin (a) and the hydrogenated block copolymer (b) [(a)/{(a)+(b)}] (by mass) is preferably 50/100 to 95/100, more preferably 55/100 to 90/100, even more preferably 60/100 to 90/100, and especially preferably 65/100 to 85/100. When the content ratio is 50/100 or more, moldability is likely to be good, and when the content ratio is 95/100 or less, flexibility and transparency is likely to be good.

(Other Components)

The resin composition of the present invention may contain any other components in addition to the polypropylene-based resin (a) and the hydrogenated block copolymer (b), within a range not detracting from the advantageous effects of the present invention.

Examples of the other components include additives such as an antioxidant, a UV absorbent, a light stabilizer, a colorant and a crystal nucleating agent; hydrogenated resins such as hydrogenated chromane/indene resins, hydrogenated rosin resins, hydrogenated terpene resins, and alicyclic hydrogenated petroleum resins; tackifier resins such as aliphatic resins of olefin and diolefins polymers; and other polymers such as hydrogenated polyisoprenes, hydrogenated polybutadienes, hydrogenated styrene-butadiene random copolymers, hydrogenated styrene-isoprene random copolymers, butyl rubbers, polyisobutylenes, and polybutenes.

The resin composition of the present invention may further contain an ethylene-α-olefin copolymer (c) (provided that the component (c) does not contain the above-mentioned polypropylene-based resin (a)), for the purpose of more improving bag-breakage resistance performance (at room temperature and low temperature).

The ethylene-α-olefin copolymer (c) is not specifically limited so far as the content of the structural unit derived from an ethylene monomer (hereinafter this may be abbreviated as an ethylene content) therein is 50 to 95 mol %, and any known ethylene-α-olefin copolymer may be used.

Examples of the ethylene-α-olefin copolymer include an ethylene-propylene copolymer, an ethylene-1-butene copolymer, an ethylene-1-hexene copolymer, an ethylene-1-heptene copolymer, an ethylene-1-octene copolymer, an ethylene-4-methyl-1-pentene copolymer, an ethylene-1-nonene copolymer, and an ethylene-1-decene copolymer, and denatured derivatives thereof. The denatured derivatives include those obtained through graft copolymerization of these copolymers with a denaturant and those obtained through copolymerization of these copolymers with a denaturant at the main chain thereof. Examples of the denaturant include unsaturated dicarboxylic acids such as maleic acid, citraconic acid, halogenomaleic acid, itaconic acid, cis-4-cyclohexene-1,2-dicarboxylic acid, and endo-cis-bicyclo[2.2.1]-5-heptene-2,3-dicarboxylic acid; esters, amides or imides of unsaturated dicarboxylic acids; unsaturated dicarboxylic acid anhydrides such as maleic anhydride, citraconic anhydride, halogenomaleic anhydride, itaconic anhydride, cis-4-cyclohexene-1,2-dicarboxylic acid anhydride, and endo-cis-bicyclo[2.2.1]-5-heptene-2,3-dicarboxylic acid anhydride; unsaturated monocarboxylic acids such as acrylic acid, methacrylic acid, and crotonic acid; esters of unsaturated monocarboxylic acids (methyl acrylate, ethyl acrylate, methyl methacrylate, ethyl methacrylate, etc.), and amides or imides thereof. The ethylene-α-olefin copolymer (c) is preferably a non-denatured one.

In addition, the resin composition of the present invention may also contain a hydrogenated block copolymer (b'), which is a hydrogenation product of a block copolymer containing a polymer block (A') that mainly contains a structural unit derived from an aromatic vinyl compound and a polymer block (B') that mainly contains a structural unit derived from isoprene, a structural unit derived from butadiene or a structural unit derived from a mixture of isoprene and butadiene, and which has a glass transition temperature (Tg) of −60° C. or higher and lower than −50° C., or higher than −35° C. and −5° C. or lower. Tg of the hydrogenated block copolymer (b') is preferably −60° C. or higher and lower than −50° C., or higher than −35° C. and −10° C. or lower, more preferably −58° C. or higher and −52° C. or lower, or higher than −35° C. and −10° C. or lower.

The hydrogenated block copolymer (b') is the same as the above-mentioned hydrogenated block copolymer (b) except for the glass transition temperature.

In the case where the resin composition contains the hydrogenated block copolymer (b'), preferably, the hydrogenated block copolymer (b) is immiscible with the hydrogenated block copolymer (b). The word "immiscible" as referred to herein means that the difference in the glass transition temperature between the hydrogenated block copolymer (b) and the hydrogenated block copolymer (b') is preferably 6° C. or more. The difference in the glass transition temperature between the two is more preferably 10° C. or more. When the hydrogenated block copolymer (b) is combined with the hydrogenated block copolymer (b') immiscible with the former, the hydrogenated block copolymer (b) and the hydrogenated block copolymer (b) tend to strongly individually monodisperse in the resin composition, and such is favorable from the viewpoint that a resin composition capable of exhibiting desired effects is easy to prepare.

In the resin composition, the total content of the polypropylene-based resin (a) and the hydrogenated block copolymer (b) is, from the viewpoint of the advantageous effects of the present invention, preferably 50% by mass or more, more preferably 700% by mass or more, even more preferably 80% by mass or more, still more preferably 90% by mass or more, and further more preferably 95% by mass or more.

In the case where the resin composition contains the above-mentioned hydrogenated block copolymer (b), the content of the hydrogenated block copolymer (b') is preferably 10 to 90 parts by mass relative to 100 parts by mass of the total of the hydrogenated block copolymer (b) and the hydrogenated block copolymer (b'), more preferably 20 to 80 parts by mass, even more preferably 30 to 70 parts by mass, and especially preferably 40 to 60 parts by mass.

In the case where the resin composition contains the above-mentioned ethylene-α-olefin copolymer (c), the content thereof is preferably 30 parts by mass or less relative to 100 parts by mass of the resin composition, more preferably 20 parts by mass or less, even more preferably 15 parts by mass or less. The ethylene-α-olefin copolymer (c), when contained in an amount of 1 part by mass or more relative to 100 parts by mass of the resin composition, makes the resin composition exhibit the advantageous effects more readily, and from the same viewpoint, the content may be 3 parts by mass or more, or may be 5 parts by mass or more.

(Properties of Resin Composition)

The resin composition of the present invention can give a liquid-packaging container capable of satisfying both high flexibility and low-temperature impact resistance, and excellent in low-temperature heat seal strength and bag-breakage strength (bag-breakage strength at room temperature of 15 to 30° C. and at a low temperature of −10 to 10° C.). One reason would be considered to be the morphology of the resin composition of the present invention. Apparent from an observation of the morphology (microstructure) of the resin composition of the present invention, because the affinity between the polypropylene-based resin (a) and the hydrogenated block copolymer (b) falls within a suitable range, the resin composition has a phase-separated structure where the two components therein are not too much mixed and are not too much separated as in FIG. 1. Such a structure seems to provide the resin composition with the above-mentioned advantageous effects, though the accurate reason is unclear. Above all, it is especially preferable that the resin composition has a morphology (microstructure) where the polypropylene-based resin (a) forms a continuous phase and the hydrogenated block copolymer (b) forms an island disperse phase, and where the islands to form the disperse phase contain those having a length in the major axis direction of 500 nm or more. When the hydrogenated block copolymer (b) exists as an island phase having a length in the major axis direction of 500 nm or more, voids can be readily formed starting from the island phase of the hydrogenated block copolymer (b) with the result that the stress concentration toward the sea phase of the resin composition can be prevented, and even when the phase of the resin composition is cracked, the cracks can be prevented from propagating further by the island phase of the hydrogenated block copolymer (b), and accordingly, it is considered that the bag-breakage strength at low temperature and room temperature can be further excellent. From this viewpoint, it may be considered that a morphology where the island phase of the hydrogenated block copolymer (b) linearly extends in MD (in the flow direction) with no significant discontinuity therein would be more preferred for the resin composition.

A suitable dispersion diameter (diameter in the major axis direction) of the hydrogenated block copolymer (b) in the resin composition is, though depending on the necessary properties, preferably 500 nm to 10 μm, more preferably 500 nm to 8 μm, even more preferably 500 nm to 6 μm.

In the case where the resin composition contains the ethylene-α-olefin copolymer (c), preferably, the ethylene-α-olefin copolymer (c) forms an island-like disperse phase in the morphology like the hydrogenated block copolymer (b) therein, and more preferably, the ethylene-α-olefin copolymer (c) exists as an island phase having a length in the major axis direction of 500 nm or more.

Preferably, the resin composition of the present invention satisfies the following expression (1) from the viewpoint of satisfying both high flexibility and low-temperature impact resistance and attaining excellent low-temperature heat seal strength and high bag-breakage strength.

$$2.5° C. \leq |tp(a)-tp(ab)| \leq 12° C. \quad (1)$$

wherein tp(a) represents a tan δ peak top temperature (° C.) derived from a polypropylene-based resin (a) in the case of the polypropylene-based resin (a) alone, and tp(ab) represents a tan δ peak top temperature (° C.) derived from a polypropylene-based resin (a) in the case of the resin composition of the polypropylene-based resin (a) and the hydrogenated block copolymer (b) only as kneaded in a ratio (by mass) of polypropylene-based resin (a)/hydrogenated block copolymer (b)=70/30.

Here, |tp(a)−tp(ab)| represents an absolute value of the difference between tp(a) and tp(ab).

The lower limit of |tp(a)−tp(ab)| in the expression (1) is preferably 3.0° C., more preferably 3.5° C., even more preferably 4.0° C. The upper limit of |tp(a)−tp(ab)| in the expression (1) is preferably 10.0° C., more preferably 9.0° C., even more preferably 8.0° C. However, in the case where the resin composition contains two or more kinds of hydrogenated block copolymers, at least one hydrogenated block copolymer is simply required to satisfy the above expression.

As described above, in the resin composition of the present invention, the hydrogenated block copolymer (b) is not too much separated from the polypropylene-based resin (a) and is mixed therewith moderately, and therefore, the peak temperature of the internal loss (tan δ) of the polypropylene-based resin (a) tends to shift to the side of the peak temperature of tan δ of the hydrogenated block copolymer (b) that is positioned on the lower temperature side. This tendency is stronger when the hydrogenated block copolymer (b) is mixed "moderately" with the polypropylene-based resin (a). The above-mentioned expression (1) shows the tendency as an inequality expression, and in this description, the value to be obtained from the expression may be referred to as a tan δ peak top shift value.

The Young's modulus of the resin composition of the present invention is preferably 650 MPa or less from the viewpoint of flexibility.

In particular, in the case where the content ratio of the polypropylene-based resin (a) relative to the total of the polypropylene-based resin (a) and the hydrogenated block copolymer (b) [(a)/{(a)+(b)}] (by mass) is 50/100 or more and 75/100 or less, the Young's modulus is more preferably 470 MPa or less from the viewpoint of flexibility, even more preferably 400 MPa or less, especially preferably 380 MPa or less, and most preferably 350 MPa or less and may be 330 MPa or less.

In the case where the content ratio of the polypropylene-based resin (a) relative to the total of the polypropylene-based resin (a) and the hydrogenated block copolymer (b) [(a)/{(a)+(b)}] (by mass) is more than 75/100 and 90/100 or less, the Young's modulus is more preferably 650 MPa or less from the viewpoint of flexibility, and especially preferably 600 MPa or less.

The lower limit of the Young's modulus is not specifically limited, but in any description made above, it may be 100 MPa or may be 150 MPa.

The Young's modulus is a value measured according to the method described in the section of Examples.

[Heat Sealing Agent]

The resin composition of the present invention is excellent in heat seal strength, especially in low-temperature heat seal strength. Consequently, the present invention also provides a heat sealing agent containing the resin composition of the present invention.

In the case where the composition is used as a heat sealing agent, for example, it is desirable that the composition is used after molded to have a desired shape such as a film. The film molding method is not specifically limited, and examples thereof include injection molding, compression molding and extrusion molding. The film formed through injection molding or compression molding may be markedly excellent in low-temperature heat seal strength, and the film formed through compression molding tends to be more markedly excellent low-temperature heat seal strength. When formed into a film, the thickness thereof is not specifically limited and is preferably 100 to 500 μm, more preferably 110 to 400 μm.

The temperature in heat sealing with the heat sealing agent is preferably 140 to 180° C., and heat sealing at a low temperature of 140 to 170° C., even at 140 to 160° C. is possible.

Regarding the subject to be heat-sealed, a molded article containing a thermoplastic resin composition is preferred from the viewpoint of adhesiveness, a molded article containing a thermoplastic resin composition containing a polyolefin-based resin is more preferred, and a molded article containing a thermoplastic resin composition containing a polypropylene-based resin is even more preferred. From the viewpoint of heat seal strength, especially low-temperature heat seal strength, the thermoplastic resin composition preferably contains a hydrogenated styrene-based thermoplastic elastomer or the like, and the resin composition of the present invention is more preferred.

In the present invention, any one that contains the resin composition is referred to as a heat sealing agent, irrespective of before molding or after molding.

[Film for Liquid-Packaging Container, and Liquid-Packaging Container]

The resin composition of the present invention may be formed into a molded article of a film or a sheet, and a liquid-packaging container may be formed of the film or sheet. Namely, the present invention also provides a film for liquid-packaging container containing the resin composition of the present invention, and a liquid-packaging container formed of the film for liquid-packaging container. Here, a film and a sheet may be differentiated depending on the difference in thickness, but the boundary is not always clear. In the present invention, accordingly, a "film" or a "sheet" may be referred to in the meaning that contains both the two.

The film for liquid-packaging container may be a single layer or may be a multi-layer. In the case of a multi-layer, at least one layer is simply required to contain the resin composition of the present invention.

The thickness of the film for liquid-packaging container is not specifically limited, and is preferably 100 to 500 µm, more preferably 110 to 400 m.

The liquid-packaging container formed of the film for liquid-packaging container satisfies all of flexibility, transparency, heat seal strength (especially low-temperature heat seal strength) and bag-breakage strength. The liquid-packaging container may be a multi-chamber packaging container where the inside is partly partitioned. The partitioning may be opened by a predetermined pressure so that the partitioned plural rooms become one room.

Examples of preferred embodiments of the liquid-packaging container of the present invention include liquid-packaging containers of the following [I] to [IV].

[I] A liquid-packaging container including a two-layer or more multi-layer laminate having an inner layer and an outer layer, wherein:

the inner layer contains the resin composition of the present invention [hereinafter referred to as resin composition (X)], and the outer layer contains a resin composition (Y) that contains a polypropylene-based resin having a propylene-derived structural unit content of 60 mol % or more, in an amount of 65% by mass or more.

[II] A liquid-packaging container including a three-layer or more multi-layer laminate having a middle layer between an inner layer and an outer layer, wherein:

at least one selected from the group consisting of the inner layer and the middle layer contains the resin composition (X), and the outer layer contains a resin composition (Y) that contains a polypropylene-based resin having a propylene-derived structural unit content of 60 mol % or more, in an amount of 55% by mass or more.

[III] A liquid-packaging container including a two-layer or more multi-layer laminate having an inner layer and an outer layer, wherein at least one selected from the group consisting of the inner layer and the outer layer contains the resin composition (X) of the present invention.

[IV] A liquid-packaging container including a three-layer or more multi-layer laminate having a middle layer between an inner layer and an outer layer, wherein the outer layer contains the resin composition (X) of the present invention.

These liquid-packaging containers have a layer containing the resin composition (X), and therefore satisfy all of flexibility, transparency, heat seal strength (especially low-temperature heat seal strength) and bag-breakage strength.

The materials for use for the constituent layers of the liquid-packaging containers [I] to [IV] are described below.

(Inner Layer and Middle Layer)

The inner layer is a layer that is to be in contact with the liquid when a liquid is packed in the liquid-packaging container. The middle layer is a layer positioned between the inner layer and the outer layer, and the container may have or may not have the middle layer, but from the viewpoint of attaining a higher bag-breakage strength, the container preferably has the middle layer.

In the liquid-packaging container of the above [I], the inner layer contains the resin composition (X) of the present invention. In the liquid-packaging container of the above [II], at least one selected from the group consisting of the inner layer and the middle layer contains the resin composition (K) of the present invention. In the liquid-packaging container of the above [III], the inner layer may contain the resin composition (X) or may be formed of any other resin. In the liquid-packaging container of the above [IV], the resin constituting the inner layer and the outer layer is not specifically defined, and may contain the resin composition (X) or may be formed of any other resin than the resin composition (X). In one preferred embodiment of the liquid-packaging container of the above [IV], at least one selected from the group consisting of the inner layer and the middle layer contains the resin composition (X) of the present invention, or in another preferred embodiment thereof, both the inner layer and the middle layer contain the resin composition (X) of the present invention.

Further, the melting point $MP_{in}$ of the resin component constituting the inner layer and the melting point $MP_{mid}$ constituting the resin composition of the middle layer preferably satisfy the following expression.

$$MP_{in} < MP_{mid}$$

(Outer Layer)

In the liquid-packaging container of the above [I] and [II], the outer layer contains a resin composition (Y) containing a polypropylene-based resin having a propylene-derived structural unit content of 60 mol % or more, in an amount of 55% by mass or more.

The polypropylene-based resin is described in the same manner as that for the polypropylene-based resin (a). Above all, the propylene-based structural unit content in the polypropylene-based resin is preferably 80 mol % or more, more preferably 80 to 100 mol %, even more preferably 85 to 100 mol %, and especially preferably 90 to 100 mol %.

Preferably, the melting point of the polypropylene-based resin is 130 to 180° C. When the melting point of the polypropylene-based resin is 130° C. or higher, wall thinning of the film in heat sealing can be prevented. When the melting point of the polypropylene-based resin is 180° C. or lower, the film moldability becomes good. From the same viewpoints, the melting point of the polypropylene-based resin is more preferably 140 to 175° C., even more preferably 150 to 175° C.

Preferably, the polypropylene-based resin is at least one selected from the group consisting of a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and denatured derivatives thereof, and is more preferably a homopolypropylene.

The resin composition (Y) preferably contains a hydrogenated block copolymer that has a polymer block mainly containing a structural unit derived from an aromatic vinyl compound and a polymer block mainly containing a structural unit derived from a conjugated diene compound. An example of the hydrogenated block copolymer is a hydrogenated block copolymer (b', which is a hydrogenation product of a block copolymer that contains a polymer block (A') mainly containing a structural unit derived from an aromatic vinyl compound and a polymer block (B') mainly containing a structural unit derived from isoprene, a structural unit derived from butadiene, or a structural unit derived from a mixture of isoprene and butadiene, and has a glass transition temperature (Tg) of −60° C. or higher and lower than −50° C. or higher than −35° C. and −5° C. or lower. The hydrogenated block copolymer (b') is as described above.

As described above, the resin composition (Y) contains a polypropylene-based resin in an amount of 55% by mass or more, preferably 60% by mass or more, more preferably 60 to 99% by mass, further more preferably 70 to 99% by mass, and especially preferably 85 to 99% by mass. When the content of the polypropylene-based resin is 55% by mass or more, mechanical strength and moldability tend to be good.

In the case where the resin composition (Y) contains the hydrogenated block copolymer (b'), the content of the hydrogenated block copolymer (b') is less than 45% by mass, preferably less than 40% by mass, more preferably more than 1% by mass and less than 40% by mass, even more preferably more than 1% by mass and less than 30% by mass, and especially preferably more than 1% by mass and less than 15% by mass.

In the resin composition (Y), when the content of each component falls within the above-mentioned range, transparency, flexibility and heat resistance tend to be good.

The resin composition (Y) may contain any other components in addition to the above-mentioned components, within a range not detracting from the advantageous effects of the present invention.

Examples of the other components include additives such as an antioxidant, a UV absorbent, a light stabilizer, a colorant and a crystal nucleating agent; hydrogenated resins such as hydrogenated chromane/indene resins, hydrogenated rosin resins, hydrogenated terpene resins, and alicyclic hydrogenated petroleum resins; tackifier resins such as aliphatic resins of olefin and diolefins polymers; and other polymers such as hydrogenated polyisoprenes, hydrogenated polybutadienes, hydrogenated styrene-butadiene random copolymers, hydrogenated styrene-isoprene random copolymers, butyl rubbers, polyisobutylenes, and polybutenes.

The total content of the other components in the resin composition (Y) is, from the viewpoint of the advantageous effects of the present invention, preferably 50% by mass or less, more preferably 30% by mass or less, even more preferably 20% by mass or less, still more preferably 10% by mass or less, and further more preferably 5% by mass or less.

In the liquid-packaging container of the above [III], any one or both of the inner layer and the outer layer contain the resin composition (X) of the present invention. In the liquid-packaging container of the above [IV], the outer layer contains the resin composition (X) of the present invention. In particular, when the resin composition (X) of the present invention is used for the outer layer, a liquid-packaging container more excellent in room-temperature and low-temperature bag-breakage strength, one advantageous effect of the present invention, can be obtained.

In the case where plural layers constituting the liquid-packaging container of the above [I] to [IV] contain the resin composition (X) of the present invention, the layers may be differentiated from each other by the kind and the blending amount of the polypropylene-based resin (a) and the hydrogenated block copolymer (b) contained in the resin composition (X).

The components constituting the other layers in the liquid-packaging containers of the above [II] to [IV] are not specifically limited so far as they satisfy the above-mentioned constitutions, for which, for example, layers formed of any other resins than the resin composition (X) and the resin composition (Y) may be employed. In addition, for example, in the liquid-packaging containers of the above [II] to [IV], the resin composition (Y) may be used for the inner layer and the middle layer. In the case where the plural layers constituting the liquid-packaging containers of the above [I] to [IV] contain the resin composition (Y), the layers may be differentiated from each other by the kind and the blending amount of the polypropylene-based resin contained in the resin composition (Y).

(Thickness of Inner Layer, Middle Layer and Outer Layer)

The thickness of the inner layer, the middle layer and the outer layer in the liquid-packaging containers of the above [I] to [IV] is not specifically limited and may be appropriately controlled depending on the intended use. The thickness of the inner layer is preferably 5 to 50 μm, more preferably 10 to 30 μm. The thickness of the middle layer is preferably 100 to 300 μm, more preferably 100 to 200 μm, even more preferably 100 to 180 μm. The thickness of the outer layer is preferably 10 to 120 μm, more preferably 15 to 80 m, even more preferably 15 to 70 μm.

Not detracting from the advantageous effects of the present invention, any other layer may exist as an intermediate layer between the inner layer, the middle layer and the outer layer or on the surface of the outer layer. The other layer includes an adhesive layer, a protective layer, a coating layer, a light reflecting layer, and a light absorbent layer.

In the liquid-packaging container of the present invention, preferably, the inner layer and the middle layer are in contact with each other, and also preferably, the middle layer and the outer layer are in contact with each other. Such a liquid-packaging container formed of three layers of an inner layer, a middle layer and an outer layer is preferred.

(Method for Producing Liquid-Packaging Container)

The method for producing the liquid-packaging container is not specifically limited. According to a known laminate production method, a laminate is formed, then heat-sealed and cut off (cut out) to give a liquid-packaging container, and for medical use, this is sterilized. Here, employment of the above-mentioned materials for the constituent layers provides good film moldability, and therefore, conveniently, a film (laminate) with neither fish eyes nor foreign impurities is easy to form.

As a method for producing the laminate, for example, the following method is preferred. First, the materials for each layer are kneaded using a kneading machine such as a single-screw extruder, a twin-screw extruder, a kneader, a Banbury mixer or a roll mixer to prepare a resin composition for each layer. The resultant resin compositions are molded into a film or a tube through co-extrusion molding using a multilayer T-die, or air-cooling or water-cooling inflation molding using a multilayer circular T-die. The resin temperature in molding is preferably 150 to 300° C., more preferably 180 to 250° C., even more preferably 180 to 220° C. The cooling temperature in air-cooling or water-cooling inflation molding is preferably 7 to 70° C., more preferably 10 to 40° C. From the viewpoint of easiness in producing the liquid-packaging container, preferably, the resin composition is molded to be a tubular form. The tubular molded article can readily produce a liquid-packaging container by heat sealing and then cutting away (cutting out). On the other hand, in the case of a filmy molded article, two such films must be layered and then heat-sealed.

For medical use, in addition, sterilization such as steam sterilization or autoclave sterilization is needed. In the case of autoclave sterilization, the heating temperature is preferably 100 to 150° C., more preferably 110 to 140° C.

When equipped with a liquid discharge member including a cap such as a port or a rubber stopper, there can be provided a liquid-packaging container having an ejecting mouth of a liquid-packaging container, and this can be effectively utilized as a medical container such as an infusion bag. In that manner, the present invention also provides a medical container having the liquid-packaging container. The medical container may be a multi-chamber container where the inside is partly partitioned. The partitioning may be opened by a predetermined pressure so that the partitioned plural rooms become one room.

(Material of Liquid Discharge Member)

A port is a part of a liquid discharge member. Preferably, the port or the liquid discharge member contains a thermoplastic elastomer composition from the viewpoint of the heat seal strength (low-temperature heat seal strength) to the film for liquid-packaging container, more preferably contains a styrenic thermoplastic elastomer composition, and even more preferably contains the resin composition (X) of the present invention.

The thermoplastic elastomer composition is not specifically limited, and examples thereof include polybutadiene; polyisoprene; an α-olefinic elastomer such as polyethylene, polypropylene, polybutene or EPDM; an ethylene-vinyl acetate copolymer (EVA); and the styrenic thermoplastic elastomer to be mentioned below. Not specifically limited, the styrenic thermoplastic elastomer composition may be any composition that contains a known styrenic thermoplastic elastomer but preferably contains a polypropylene-based resin. The polypropylene-based resin may be the same as the above-mentioned polypropylene-based resin (a) and preferred examples thereof are also the same as those of the latter. The polypropylene-based resin (a) may be denatured with a silicone rubber or the like.

Examples of the styrenic thermoplastic elastomer include a hydrogenated product of a styrene-butadiene-styrene triblock copolymer (SEBS), a hydrogenated product of a styrene-isoprene-styrene triblock copolymer (SEPS), and a hydrogenated product of a styrene-(isoprene/butadiene)-styrene triblock copolymer (SEEPS). In the case where the styrenic thermoplastic elastomer composition contains a polypropylene-based resin, the content of the styrenic thermoplastic elastomer relative to the total amount of the styrenic thermoplastic elastomer and the polypropylene-based resin is preferably 5 to 80% by mass, more preferably 6 to 70% by mass, even more preferably 10 to 70% by mass.

The port or the liquid discharge member may further contain an additive such as a colorant.

In the liquid-packaging container having a liquid discharge member, the material of the liquid discharge member may be the same as or may differ from the material of the liquid-packaging container. For example, (i) the liquid-packaging container contains the resin composition (X) of the present invention and the liquid discharge member contains any other thermoplastic elastomer composition than the resin composition (X) (or a styrenic thermoplastic elastomer composition), or (ii) the liquid-packaging container contains the resin composition (X) of the present invention, and the liquid discharge member contains the resin composition (X), or (iii) the liquid-packaging container contains any other thermoplastic elastomer composition than the resin composition (X) (or a styrenic thermoplastic elastomer composition) and the liquid discharge member contains the resin composition (X).

(Method for Producing Liquid Discharge Member)

The method for producing the liquid discharge member is not specifically limited, and, in general, the member is produced through injection molding. The injection molding condition is not specifically limited. Preferably, for example, the constituent components are blended in dry to give pellets, and using an injection-molding machine, the pellets are injection-molded at a cylinder temperature of 170 to 230° C., at a mold temperature of 10 to 50° C., at an injection rate of 10 to 50 mm/sec and under an injection pressure of 70 to 130 MPa. The shape of the liquid discharge member is not specifically limited, but from the viewpoint of liquid flowability, in general, the hollow portion of the member is preferably cylindrical, that is, the cross section thereof cut in the vertical direction relative to the liquid flow direction is preferably circular.

The present invention also provides the liquid-packaging container equipped with the liquid discharge member. In general, the liquid discharge member is fixed to the liquid-packaging container by heat sealing thereto, and when the resin composition of the present invention is used, the low-temperature heat seal strength is increased, and therefore heat sealing at a low temperature is possible, that is, a risk of reducing the bag-breakage strength owing to film thinning to occur in high-temperature heat sealing can be reduced.

(Use)

As described above, the resin composition of the present invention can be effectively utilized not only for a material for a liquid-packaging container but also for a material for a liquid discharge member of a liquid-packaging container, especially for a material for a port.

In addition, the liquid-packaging container of the present invention can also be effectively utilized, for example, for the above-mentioned medical tool and also for other various uses for food-packaging containers for packaging retort food, mayonnaise, ketchup, refreshing drink, ice, etc.

EXAMPLES

The present invention is described more concretely with reference to Examples and others, but the present invention is not whatsoever restricted by these Examples. The physical properties in Examples and Comparative Examples were measured and evaluated according to the methods mentioned below.

[Method for Measurement and Evaluation]

<Weight Average Molecular Weight (Mw)>

Measured in terms of a standard polystyrene-equivalent molecular weight through gel permeation chromatography (GPC)>

Apparatus: GPC apparatus "HLC-8020" (manufactured by Tosoh Corporation)

Separation columns: "TSKgel GMHXL", "G4000HXL" and "G5000HXL", all manufactured by Tosoh Corporation, were serially concatenated.

Eluent: tetrahydrofuran
Eluent flow rate: 1.0 ml/min
Column temperature: 40° C.
Detection method: differential refractive index (RI)

<Content of Polymer Block (A), (A') and Hydrogenation Rate of Polymer Block (B) in Hydrogenated Block Copolymers (b) and (b')>

The data were measured through $^1$H-NMR.

Apparatus: nuclear magnetic resonator "Lambda-500" (manufactured by JEOL Ltd.)

Solvent: deuterated chloroform

<Vinyl Bond Amount (Total Content of 1,2-Bond and 3,4-Bond) in Polymer Block (B) in Hydrogenated Block Copolymers (b) and (b')>

The block copolymer before hydrogenation was analyzed through $^1$H-NMR, in which the proportion of the peak area of 1,2-bond and 3,4-bond to the total of the peak area of 1,2-bond and 3,4-bond and the peak area of 1,4-bond was calculated to be the vinyl bond amount.

<Glass Transition Temperature>

Using a differential scanning calorimeter "DSC6200" manufactured by Seiko Instruments Inc., the hydrogenated block copolymer (b) or (b') or the resin composition produced in each Example was accurately weighed, then heated from −120° C. to 100° C. at a heating rate of 10° C./min, and the temperature at the inflection point of the measured curve was read to be the glass transition temperature (Tg) of the tested sample.

<Tan δ Peak Top Shift Value (° C.): |Tp(a)−Tp(Ab)|>

A resin composition of 30 parts by mass of the hydrogenated block copolymer (b) or (b') obtained in each Production Example and 70 parts by mass of the polypropylene-based resin (a) used in each Example was formed into a film according to the same method as in Example 1. The film was cut in MD into a size of 5 mm×20 mm to be a test piece. Tan δ was measured according to JIS K 7244(1999), as follows: Using a dynamic viscoelastometer (DMA 242E Artemis, manufactured by NETZSCH Japan KK), the storage modulus (E') and the loss modulus (E") from −120° C. to 100° C. of the sample were measured under a stress-strain mixed control mode of a tensile mode at a heating rate of 3° C./min, at PF (static load/dynamic load)=1.300, at a target amplitude absolute value of 30 μm, and at a maximum kinematic load of 2.182 N, and from the data, tan δ (E"/E') was calculated. A value at which the peak is the maximum is referred to as tp(ab). In the heating process, the sample was measured at three frequencies (1 Hz, 5 Hz, 10 Hz) at 15 seconds/i point in that order, and the data measured at 10 Hz were used.

In place of the resin composition, the polypropylene-based resin (a) alone used in each Example was analyzed in the same manner as above, and tan δ (E"/E') thereof was calculated, and the value at which the peak is the maximum is referred to as tp(a).

A difference between the peak top temperature tp(a) of the film of the polypropylene-based resin (a) alone and the peak top temperature tp(ab) derived from the polypropylene-based resin in evaluation of the film formed of a film of the polypropylene-based resin (a) and the hydrogenated block copolymer (b) |tp(a)−tp(ab)| was calculated to be the tan δ peak top shift value of the sample tested.

<Morphology of Resin Composition, and Size of Island to Form Disperse Phase>

Figure 2:
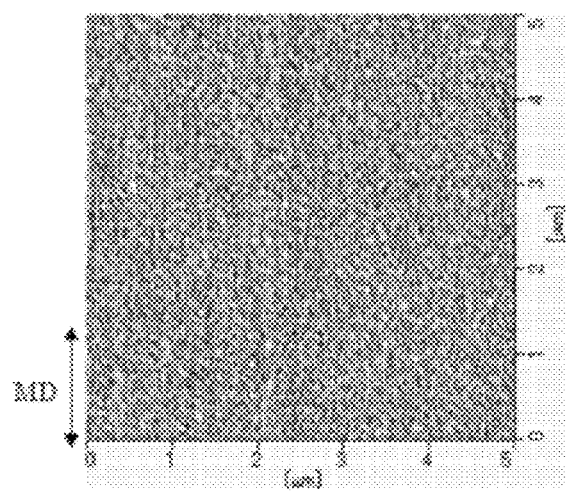
FIG. 2 shows an image of a phase structure of a film for liquid-packaging container as observed with a scanning probe microscope (SPM), corresponding to the morphology evaluation B in Examples.
Figure 3:
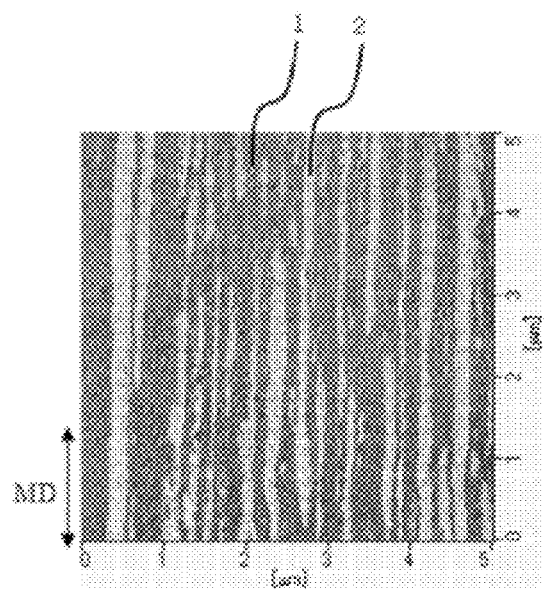
FIG. 3 shows an image of a phase structure of a film for liquid-packaging container as observed with a scanning probe microscope (SPM), corresponding to the morphology evaluation C in Examples.

Using a scanning probe microscope "Probe Station SPI4000/Environment Control-type Unit E-sweep" (manufactured by SII Nanotechnology Inc.), the morphology of the cross section of a layer was observed. While kept frozen with liquid nitrogen, the sample to be observed was cut in MD, using a glass knife and an ultramicrotome, to make the cross section thereof exposed out. The cross section was observed at 25° C. under normal pressure within a range of scanning size of 5×5 μm and 2×2 μm in a DFM mode to take a phase image. Here, FIGS. 1 to 3 show images taken by scanning the inner layer or the middle layer of the film for liquid-packaging container in the machine direction (MD) in film production, using a scanning probe microscope. In FIGS. 1 to 3, the region 1 (hard region) corresponds to the polypropylene-based resin (a), and the region 2 (soft region) corresponds to the hydrogenated block copolymer (b).

(Morphology)

The island phase in a scanning size of 5×5 μm was evaluated according to the following evaluation standards.

A: The island phase has a morphology of any of 1a to 1c shown in FIG. 1. 1a has disperse phases continuing in MD with no significant discontinuity. 1b and 1c have island-like disperse phases and disperse phases continuing in MD.
B: The island phase has a morphology of shown in FIG. 2. The majority are island-like disperse phases.
C: The island phase has a morphology of shown in FIG. 3. This has oval disperse phases extending in MD.

(Size of Island to Form Disperse Phase)

The length of the island in the major axis direction in the scanning size of 2×2 μm was measured using a scale, and evaluated according to the following evaluation standards.

A: Islands having a size of 500 nm or more exist.
B: Islands having a size of 500 nm or more do not exist.

In the case where the hydrogenated block copolymer (b) and the hydrogenated block copolymer (b') were used together, the disperse phase contained both the two, that is, the island size was a value determined from the disperse phase containing both the two.

<Tensile Shear Adhesion Strength Between Polypropylene-Based Resin (a) and Hydrogenated Block Copolymer (b) or (b')>

A test piece was prepared in which the polypropylene-based resin (a) used in each Example was an adherend (thickness 1 mm) and the hydrogenated block copolymer (b) or (b') was an adhesive layer (thickness 0.5 mm), and according to JIS K 6850(1999), spacers of 2.6 mm were arranged at both ends of the test piece, heat-sealing was performed under the condition of 0.4 MPa, 30 seconds and 160° C., and then the tensile shear adhesion strength was measured at a tensile speed of 500 mm/min.

In the case where two kinds or more of hydrogenated block copolymers (b) alone were used, a mixture thereof was used to form the adhesive layer, while in the case where two kinds or more of hydrogenated block copolymers (b') alone were used, a mixture thereof was also used to form the adhesive layer. On the other hand, in the case where the hydrogenated block copolymer (b) and the hydrogenated block copolymer (b') were used as combined (Examples), the hydrogenated block copolymer (b) alone formed the adhesive layer.

<Low-Temperature Impact Resistance>

The single-layer film produced in each Example was analyzed according to the same method as the film measurement method for the "tan δ peak top shift value" mentioned above, and the value E' at −25° C. and the tan δ peak strength were calculated to be the indices of low-temperature impact resistance.

A smaller value E' indicates more excellent impact resistance, and the case where E' is 2,200 MPa or less is preferred as excellent in impact resistance at −10 to 10° C., and the case where E' is 2,000 MPa or less is more preferred.

A larger value of tan δ peak strength indicates more excellent impact resistance, and the case where the peak strength is 0.040 or more is preferred as excellent in impact resistance at −10 to 10° C., and the case where the peak strength is 0.060 or more is more preferred.

<Young's Modulus>

The single-layer film or the three-layer film produced in each Example was cut to give a test piece having a size of 25 mm×75 mm (thickness 200 μm), and using "Instron 3345" (manufactured by Instron Company), the Young's modulus thereof was measured at room temperature (23° C.) and at 6 mm/min. A smaller value indicates more excellent flexibility.

<Heat Seal Strength>

Using the injection sheet or the press sheet produced in each Example, the three-layer film of Comparative Example 18 was heat-sealed on the inner layer side under the condition of 150° C. or 160° C. and a gauge pressure of 0.4 MPa for 2 seconds to prepare a test piece. Using "Instron 3345" (manufactured by Instron Company), the test piece was tested for a 180° peel test under the condition of 300 mm/min.

<Bag-Breakage Strength (Room Temperature)>

The single-layer film or the three-layer film produced in each Example was cut into a size of 15 cm×9 cm, and two of the resultant pieces were put one upon another (provided that the three-layer film pieces were put one upon another in such a manner that the inner layers thereof could face each other), and three of the four sides were heat-sealed at 140° C. and a gauge pressure of 0.4 MPa (but 0.05 MPa for the single-layer film pieces) and for a heating period of time of 1 second (but 2 seconds for the single-layer film pieces), then 100 cc of water was poured into the resultant bag through the open mouth, and the one open side was heat-sealed under the same condition as above thereby producing a liquid-packaging container having a volume of 100 cc.

The resultant liquid-packaging container was statically put on an iron plate in an environment at 23° C., and then an iron plate of 1 kg (9.8 N) was dropped thereonto three times from the above. The same test was carried out at intervals of 3 cm, and the uppermost height not to break the bag was referred to as an index of bag-breakage strength at room temperature. A larger value indicates that the bag-breakage strength at room temperature is higher.

<Bag-Breakage Strength (Low Temperature)>

The liquid-packaging container produced in the test for bag-breakage strength (room temperature) described above was statically left on an iron plate at 4° C., and then an iron plate of 1 kg (9.8 N) was dropped thereonto three times from the above. The same test was carried out at intervals of 2 cm, and the uppermost height not to break the bag was referred to as an index of bag-breakage strength (at low temperature). A larger value indicates that the bag-breakage strength at low temperature is higher.

[Raw Material Polymers Used in Examples]

Details of the components used in Examples and Comparative Examples and the production methods for the components are shown below. The physical data of the components are summarized in Tables 1 to 3.

[Polypropylene-Based Resin (a)]

Polypropylene-based resin (a-1): "Wintec (registered trademark) WFX4" (manufactured by Japan Polypropylene Corporation), propylene-ethylene random copolymer, MFR 7 g/10 min (230° C., 21.6 N), melting point 125° C.

Polypropylene-based resin (a-2): "PT-100" (manufactured by LCY CHEMICAL Corporation), homopolypropylene, MFR 1.6 g/10 min (230° C., 21.6 N), melting point 164° C., propylene content 100 mol %

Polypropylene-based resin (a-3): "SB-520Y" (manufactured by LOTTE CHEMICAL Corporation), propylene-ethylene random copolymer, MFR 2.4 g/10 min (230° C., 21.6 N), melting point 154° C., propylene content 97 mol %

Polypropylene-based resin (a-4): "SFC-750D" (manufactured by LOTTE CHEMICAL Corporation), propylene-butene random copolymer, MFR 5.8 g/10 min (230° C., 21.6 N), melting point 130° C., propylene content 90 mol %

TABLE 1

| Polypropylene-based Resin (a) | Polypropylene-based Resin (a-1) | Polypropylene-based Resin (a-2) |
|---|---|---|
| Kind | propylene-ethylene random copolymer | homopolypropylene |
| Melting Point (° C.) | 125 | 164 |
| MFR (230° C., 21.6 N) | 7 | 1.6 |
| Propylene Content (mol %) | — | 100 |

| Polypropylene-based Resin (a) | Polypropylene-based Resin (a-3) | Polypropylene-based Resin (a-4) |
|---|---|---|
| Kind | propylene-ethylene random copolymer | propylene-butene random copolymer |
| Melting Point (° C.) | 154 | 130 |
| MFR (230° C., 21.6 N) | 2.4 | 5.8 |
| Propylene Content (mol %) | 97 | 90 |

[Hydrogenated Block Copolymer (b), (b')]

Hydrogenated block copolymers (b-1) to (b-15) and hydrogenated block copolymers (b'-1) to (b'-6): Hydrogenated block copolymers (b-1) to (b-15) and hydrogenated block copolymers (b'-1) to (b'-6) produced in Production Examples 1 to 21 mentioned below were used.

Production Example 1: Production of Hydrogenated Block Copolymer (b)

50 kg of a solvent, cyclohexane and 76 g (corresponding to 8.0 g of sec-butyl lithium) of an anionic polymerization initiator, sec-butyl lithium (10.5% by mass cyclohexane solution) were put into a nitrogen-purged and dried pressure-tight container, and 170 g of a Lewis base, tetrahydrofuran was added thereto. After this was heated up to 50° C., 0.5 kg of styrene (1) was added, and polymerized for 1 hour, and subsequently at 40° C., a mixture of 8.2 kg of isoprene and 6.5 kg of butadiene [isoprene/butadiene (by mass)=55/45] was added and polymerized for 2 hours, and further this was heated up to 50° C., then 1.5 kg of styrene (2) was added and polymerized for 1 hour to give a reaction liquid containing a polystyrene-poly(isoprene/butadiene)-polystyrene triblock copolymer.

A hydrogenation catalyst, palladium carbon (palladium amount: 5% by mass) was added to the reaction liquid in an amount of 5% by mass relative to the block copolymer, and under a hydrogen pressure of 2 MPa at 150° C., this was hydrogenated for 10 hours.

After cooling and pressure discharge, palladium carbon was removed through filtration, and the filtrate was concentrated and dried in vacuum to give a hydrogenated product of polystyrene-poly(isoprene/butadiene)-polystyrene triblock copolymer (hereinafter referred to as hydrogenated block copolymer (b-1)). The physical properties of the resultant hydrogenated block copolymer (b-1) were measured and evaluated according to the above-mentioned methods. The results are shown in Table 3.

Production Examples 2 to 3, and 7 to 11, 13 and 15: Production of Hydrogenated Block Copolymer (b)

Hydrogenated block copolymers (b-2) to (b-3) and (b-7) to (b-11), (b-13) and (b-15) were produced in the same manner as in Production Example 1, except that the ratio (by mass) of isoprene to butadiene and the styrene content in Production Example 1 were changed as in Table 2-1. The physical properties of the resultant hydrogenated block copolymers (b-2) to (b-3) and (b-7) to (b-11), (b-13) and (b-15) were measured and evaluated according to the above-mentioned methods. The results are shown in Table 3.

Production Examples 4, 5 and 12: Production of Hydrogenated Block Copolymer (b))

Hydrogenated block copolymers (b-4), (b-5) and (b-12) were produced in the same manner as in Production Example 1, except that in Production Example 1, the ratio (by mass) of isoprene to butadiene, the styrene content and the Lewis base were changed as in Table 2-1 and that the polymerization temperature of isoprene/butadiene was 30° C. The physical properties of the resultant hydrogenated block copolymers (b-4), (b-5) and (b-12) were measured and evaluated according to the above-mentioned methods. The results are shown in Table 3.

Production Example 6: Production of Hydrogenated Block Copolymer (b)

50 kg of a solvent, cyclohexane and 110 g (corresponding to 11.6 g of sec-butyl lithium) of an anionic polymerization initiator, sec-butyl lithium (10.5% by mass cyclohexane solution) were put into a nitrogen-purged and dried pressure-tight container, and 20 g of a Lewis base, N,N,N'—N-tetramethylethylenediamine was added thereto. After this was heated up to 50° C., 1.1 kg of styrene (1) was added, and polymerized for 1 hour, and subsequently at 30° C., 13.6 kg of butadiene (1) was added and polymerized for 2 hours, then at 50° C., 1.1 kg of styrene (2) was added and polymerized for 1 hour, and further at 30° C., 0.8 kg of butadiene (2) was added and polymerized for 2 hours to give a reaction liquid containing a polystyrene-polybutadiene-polystyrene-polybutadiene tetrablock copolymer.

A hydrogenation catalyst, palladium carbon (palladium amount: 5% by mass) was added to the reaction liquid in an amount of 5% by mass relative to the block copolymer, and under a hydrogen pressure of 2 MPa at 150° C., this was hydrogenated for 10 hours.

After cooling and pressure discharge, palladium carbon was removed through filtration, and the filtrate was concentrated and dried in vacuum to give a hydrogenated product of polystyrene-polybutadiene-polystyrene-polybutadiene tetrablock copolymer (hereinafter referred to as hydrogenated block copolymer (b-6)). The physical properties of the resultant hydrogenated block copolymer (b-6) were measured and evaluated according to the above-mentioned methods. The results are shown in Table 3.

Production Example 14: Production of Hydrogenated Block Copolymer (b)

A hydrogenated block copolymer (b-14) was produced in the same manner as in Production Example 1, except that in Production Example 1, 30 g of styrene was added and polymerized for 30 minutes after the mixture of 8.2 kg of isoprene and 6.5 kg of butadiene was added and polymerized for 2 hours, then the product was sampled for molecular weight confirmation, and thereafter a coupling agent, methyl benzoate was added and coupled for 1 hour to give a reaction liquid containing a block copolymer, and that the amount of each reagent to be used was changed as in Table 2-1. The results of measurement of the physical data of the hydrogenated block copolymer (b-14) are shown in Table 3.

Production Examples 16 to 20, 22 and 23: Production of Hydrogenated Block Copolymer (b)

Hydrogenated block copolymers (b'-1) to (b'-5), (b'-7) and (b'-8) were produced in the same manner as in Production Example 1, except that in Production Example 1, the ratio (by mass) of isoprene to butadiene and the styrene content were changed as in Table 2-2. The physical properties of the resultant hydrogenated block copolymers (b'-1) to (b'-5), (b'-7) and (b'-8) were measured and evaluated according to the above-mentioned methods. The results are shown in Table 3.

Production Example 21: Production of Hydrogenated Block Copolymer (b')

A hydrogenated block copolymer (b'-6) was produced in the same manner as in Production Example 1, except that 30 g of styrene was added and polymerized for 30 minutes after 14.5 kg of isoprene was added and polymerized for 2 hours, then the product was sampled for molecular weight confirmation, and thereafter a coupling agent, methyl benzoate was added and coupled for 1 hour to give a reaction liquid containing a block copolymer, and that the amount of each reagent to be used was changed as in Table 2-2. The results of measurement of the physical data of the hydrogenated block copolymer (b'-6) are shown in Table 3.

TABLE 2-1

| | Hydrogenated Block Copolymer (b) | Production Example 1 b-1 | Production Example 2 b-2 | Production Example 3 b-3 | Production Example 4 b-4 | Production Example 5 b-5 | Production Example 6 b-6 | Production Example 7 b-7 | Production Example 8 b-8 |
|---|---|---|---|---|---|---|---|---|---|
| Amount Used (kg) | Cyclohexane | 50 | 50 | 50 | 50 | 50 | 50 | 50 | 50 |
| | Sec-butyl Lithium (10.5 mass % cyclohexane solution) | 0.076 | 0.076 | 0.076 | 0.09 | 0.09 | 0.110 | 0.068 | 0.067 |
| | Tetrahydrofuran | 0.170 | 0.13 | 0.106 | — | — | — | 0.170 | 0.162 |
| | N,N,N',N'-tetramethyl-ethylenediamine | — | — | — | 0.03 | 0.01 | 0.02 | — | — |
| | Styrene (1) | 0.5 | 0.5 | 0.5 | 1 | 1 | 1.1 | 0.44 | 1.87 |
| | Styrene (2) | 1.5 | 1.5 | 1.5 | 1 | 1 | 1.1 | 0.9 | 1.87 |
| | Butadiene (1) | 6.5 | 6.5 | 6.5 | 14.6 | 14.6 | 13.6 | 6.8 | 3.9 |

TABLE 2-1-continued

|  | | | | | | | | |
|---|---|---|---|---|---|---|---|---|
| Isoprene | 8.2 | 8.2 | 8.2 | — | — | — | 8.5 | 4.9 |
| Butadiene (2) | — | — | — | — | — | 0.8 | — | — |
| Methyl Benzoate | — | — | — | — | — | — | — | — |

| | Hydrogenated Block Copolymer (b) | Production Example 9 b-9 | Production Example 10 b-10 | Production Example 11 b-11 | Production Example 12 b-12 | Production Example 13 b-13 | Production Example 14 b-14 | Production Example 15 b-15 |
|---|---|---|---|---|---|---|---|---|
| Amount Used (kg) | Cyclohexane | 50 | 50 | 50 | 50 | 50 | 50 | 50 |
|  | Sec-butyl Lithium (10.5 mass % cyclohexane solution) | 0.076 | 0.033 | 0.135 | 0.076 | 0.076 | 0.187 | 0.076 |
|  | Tetrahydrofuran | 0.170 | 0.16 | 0.19 | — | 0.16 | 0.17 | 0.22 |
|  | N,N,N',N'-tetramethyl-ethylenediamine | — | — | — | 0.02 | — | — | — |
|  | Styrene (1) | 0.5 | 0.66 | 0.67 | 0.5 | 0.5 | 2 | 0.5 |
|  | Styrene (2) | 1.5 | 0.66 | 1.33 | 1.5 | 1.5 | 0.03 | 1.5 |
|  | Butadiene (1) | 6.5 | 4.27 | 6.5 | 11.7 | 2.9 | 6.5 | 6.5 |
|  | Isoprene | 8.2 | 5.38 | 8.2 | 2.9 | 11.7 | 8.2 | 8.2 |
|  | Butadiene (2) | — | — | — | — | — | — | — |
|  | Methyl Benzoate | — | — | — | — | — | 0.03 | — |

TABLE 2-2

| | Hydrogenated Block Copolymer (b') | Production Example 16 b'-1 | Production Example 17 b'-2 | Production Example 18 b'-3 | Production Example 19 b'-4 | Production Example 20 b'-5 | Production Example 21 b'-6 | Production Example 22 b'-7 | Production Example 23 b'-8 |
|---|---|---|---|---|---|---|---|---|---|
| Amount Used (kg) | Cyclohexane | 50 | 50 | 50 | 50 | 50 | 50 | 50 | 50 |
|  | Sec-butyl Lithium (10.5 mass % cyclohexane solution) | 0.076 | 0.130 | 0.166 | 0.166 | 0.166 | 0.165 | 0.169 | 0.142 |
|  | Tetrahydrofuran | 0.310 | 0.290 | — | 0.110 | — | — | 0.310 | 0.070 |
|  | N,N,N',N'-tetramethyl-ethylenediamine | — | — | — | — | — | — | — | — |
|  | Styrene (1) | 0.5 | 1.80 | 1.5 | 1.5 | 1.5 | 2.2 | 0.83 | 11.7 |
|  | Styrene (2) | 1.5 | 1.80 | 1.5 | 1.5 | 1.5 | 0.03 | — | — |
|  | Butadiene | 6.5 | — | — | 13.64 | 6.04 | — | 7 | — |
|  | Isoprene (1) | 8.2 | 13.2 | 13.6 | — | 7.61 | 14.5 | 8.8 | 5.0 |
|  | Methyl Benzoate | — | — | — | — | — | 0.03 | — | — |

TABLE 3

| | Hydrogenated Block Copolymer | Type of Block | Ip/Bd[1] (ratio by mass) | Styrene Block Content (mass %) | Weight Average Molecular Weight | Vinyl Bond Amount (mol %) | Hydrogenation rate (mol %) | Glass Transition Temperature (° C.) | MFR (g/10 min) |
|---|---|---|---|---|---|---|---|---|---|
| Production Example 1 | b-1 | ABA | 55/45 | 12 | 173,000 | 54 | 94 | −39 | 1.8 |
| Production Example 2 | b-2 | ABA | 55/45 | 12 | 193,000 | 49 | 94 | −44 | 1.5 |
| Production Example 3 | b-3 | ABA | 55/45 | 12 | 184,000 | 47 | 95 | −45 | 1.6 |
| Production Example 4 | b-4 | ABA | 0/100 | 12 | 180,000 | 77 | 99 | −42 | 3.2 |
| Production Example 5 | b-5 | ABA | 0/100 | 12 | 182,000 | 70 | 99 | −48 | 2.6 |
| Production Example 6 | b-6 | ABAB | 0/100 | 12 | 150,000 | 75 | 97 | −42 | 4 |
| Production Example 7 | b-7 | ABA | 55/45 | 8 | 192,000 | 55 | 94 | −39 | 3.7 |
| Production Example 8 | b-8 | ABA | 55/45 | 30 | 169,000 | 55 | 94 | −39 | 0.6 |
| Production Example 9 | b-9 | ABA | 55/45 | 12 | 171,000 | 55 | 88 | −39 | 2.1 |
| Production Example 10 | b-10 | ABA | 55/45 | 12 | 325,000 | 55 | 94 | −39 | 0.9 |
| Production Example 11 | b-11 | ABA | 55/45 | 12 | 107,000 | 55 | 94 | −40 | 80 |
| Production Example 12 | b-12 | ABA | 20/80 | 12 | 165,000 | 70 | 97 | −41 | 2.2 |
| Production Example 13 | b-13 | ABA | 80/20 | 12 | 179,000 | 45 | 92 | −36 | 3.8 |
| Production Example 14 | b-14 | ABA + AB | 55/45 | 12 | 173,000 | 55 | 94 | −39 | 7 |
| Production Example 15 | b-15 | ABA | 55/45 | 12 | 187,000 | 57 | 94 | −37 | 1.6 |
| Production Example 16 | b'-1 | ABA | 55/45 | 12 | 160,000 | 60 | 92 | −32 | 2.3 |
| Production Example 17 | b'-2 | ABA | 100/0 | 20 | 100,000 | 55 | 85 | −13 | 4.7 |
| Production Example 18 | b'-3 | ABA | 100/0 | 18 | 178,000 | 4 | 99 | −56 | 5 |
| Production Example 19 | b'-4 | ABA | 0/100 | 18 | 170,000 | 40 | 99 | −56 | 8 |
| Production Example 20 | b'-5 | ABA | 55/45 | 18 | 175,000 | 4 | 99 | −56 | 2.1 |

TABLE 3-continued

|  | Hydrogenated Block Copolymer | Type of Block | Ip/Bd[1] (ratio by mass) | Styrene Block Content (mass %) | Weight Average Molecular Weight | Vinyl Bond Amount (mol %) | Hydrogenation rate (mol %) | Glass Transition Temperature (° C.) | MFR (g/10 min) |
|---|---|---|---|---|---|---|---|---|---|
| Production Example 21 | b'-6 | ABA + AB | 100/0 | 13 | 172,000 | 4 | 99 | −56 | 7 |
| Production Example 22 | b'-7 | AB | 55/45 | 5 | 94,000 | 60 | 90 | −32 | 350 |
| Production Example 23 | b'-8 | AB | 100/0 | 70 | 75,000 | 35 | 94 | −40 | 120 |

[1]Ip; isoprene, Bd: butadiene

[Ethylene-α-Olefin Copolymer (c)]

Ethylene-α-olefin copolymer (c-1): "Tafmer (registered trademark) P-0775" (manufactured by Mitsui Chemicals, Ind.), ethylene-propylene random copolymer, MFR 0.6 g/10 min (230° C., 21.6 N), melting point 43° C., ethylene content 56 mol %

Examples 1 to 18, Comparative Examples 1 to 9: Production of Single-Layer Film

At the blending ratio shown in Table 4, the constituent components were melted and kneaded with a single screw to produce a resin composition.

Next, using a water-cooling downward inflation molding machine, the resin composition was molded into a single-layer film for liquid-packaging container having a thickness of 200 μm, under the condition of a resin temperature of 200° C., a cooling water temperature of 20° C. and a line speed of 10 m/min. The resultant film was evaluated and measured according to the above-mentioned methods. The results are shown in Table 4.

TABLE 4

| Single-Layer Film | | | | | | | | |
|---|---|---|---|---|---|---|---|---|
| | | Example | | | | | | |
| | | 1 | 2 | 3 | 4 | 5 | 6 | 7 |
| (a) Polypropylene-based Resin (a-3) | part by mass | 70 | 70 | 70 | 70 | 70 | 70 | 70 |
| (b) Hydrogenated Block Copolymer (b-1) | part by mass | 30 | | | | | | |
| Hydrogenated Block Copolymer (b-2) | | | 30 | | | | | |
| Hydrogenated Block Copolymer (b-3) | | | | 30 | | | | |
| Hydrogenated Block Copolymer (b-4) | | | | | 30 | | | |
| Hydrogenated Block Copolymer (b-5) | | | | | | 30 | | |
| Hydrogenated Block Copolymer (b-6) | | | | | | | 30 | |
| Hydrogenated Block Copolymer (b-7) | | | | | | | | 30 |
| Hydrogenated Block Copolymer (b-8) | | | | | | | | |
| Hydrogenated Block Copolymer (b-9) | | | | | | | | |
| Hydrogenated Block Copolymer (b-10) | | | | | | | | |
| Hydrogenated Block Copolymer (b-11) | | | | | | | | |
| Hydrogenated Block Copolymer (b-12) | | | | | | | | |
| Hydrogenated Block Copolymer (b-13) | | | | | | | | |
| Hydrogenated Block Copolymer (b-14) | | | | | | | | |
| Hydrogenated Block Copolymer (b-15) | | | | | | | | |
| (b') Hydrogenated Block Copolymer (b'-1) | part by mass | | | | | | | |
| Hydrogenated Block Copolymer (b'-2) | | | | | | | | |
| Hydrogenated Block Copolymer (b'-3) | | | | | | | | |
| Hydrogenated Block Copolymer (b'-4) | | | | | | | | |
| Hydrogenated Block Copolymer (b'-5) | | | | | | | | |
| Hydrogenated Block Copolymer (b'-6) | | | | | | | | |
| Hydrogenated Block Copolymer (b'-7) | | | | | | | | |
| Hydrogenated Block Copolymer (b'-8) | | | | | | | | |
| Tanδ peak top shift value | ° C. | 7.5 | 4.2 | 3.5 | 6.8 | 4.1 | 6.9 | 7.7 |
| Size of islands to form disperse phase | | A | A | A | B | A | B | A |
| Tensile Shear Adhesion Strength | MPa | 2.5 | 2.0 | 1.8 | 2.5 | 1.8 | 2.3 | 2.5 |
| Morphology | | A | A | A | B | A | B | A |
| Young's Modulus | MPa | 220 | 266 | 306 | 189 | 238 | 176 | 170 |
| Low-temperature impact resistance (E', −25° C.) | MPa | 1710 | 1720 | 1850 | 1940 | 1830 | 1910 | 1500 |

TABLE 4-continued

| | | Single-Layer Film | | | | | | |
|---|---|---|---|---|---|---|---|---|
| Low-temperature impact resistance (Tan δ, −25° C.) | | 0.087 | 0.067 | 0.065 | 0.115 | 0.083 | 0.112 | 0.129 |
| Bag-breakage strength (23° C.) | cm | 85 | 75 | 60 | 35 | 85 | 40 | 80 |
| Bag-breakage strength (4° C.) | cm | 30 | 26 | 24 | 32 | 28 | 32 | 38 |

| | | Example | | | | | | |
|---|---|---|---|---|---|---|---|---|
| | | 8 | 9 | 10 | 11 | 12 | 13 | 14 |
| (a) Polypropylene-based Resin (a-3) | part by mass | 70 | 70 | 70 | 70 | 70 | 70 | 70 |
| (b) Hydrogenated Block Copolymer (b-1) | part by mass | | | | | | | |
| Hydrogenated Block Copolymer (b-2) | | | | | | | | |
| Hydrogenated Block Copolymer (b-3) | | | | | | | | |
| Hydrogenated Block Copolymer (b-4) | | | | | | | | |
| Hydrogenated Block Copolymer (b-5) | | | | | | | | |
| Hydrogenated Block Copolymer (b-6) | | | | | | | | |
| Hydrogenated Block Copolymer (b-7) | | | | | | | | |
| Hydrogenated Block Copolymer (b-8) | | 30 | | | | | | |
| Hydrogenated Block Copolymer (b-9) | | | 30 | | | | | |
| Hydrogenated Block Copolymer (b-10) | | | | 30 | | | | |
| Hydrogenated Block Copolymer (b-11) | | | | | 30 | | | |
| Hydrogenated Block Copolymer (b-12) | | | | | | 30 | | |
| Hydrogenated Block Copolymer (b-13) | | | | | | | 30 | |
| Hydrogenated Block Copolymer (b-14) | | | | | | | | 30 |
| Hydrogenated Block Copolymer (b-15) | | | | | | | | |
| (b') Hydrogenated Block Copolymer (b'-1) | part by mass | | | | | | | |
| Hydrogenated Block Copolymer (b'-2) | | | | | | | | |
| Hydrogenated Block Copolymer (b'-3) | | | | | | | | |
| Hydrogenated Block Copolymer (b'-4) | | | | | | | | |
| Hydrogenated Block Copolymer (b'-5) | | | | | | | | |
| Hydrogenated Block Copolymer (b'-6) | | | | | | | | |
| Hydrogenated Block Copolymer (b'-7) | | | | | | | | |
| Hydrogenated Block Copolymer (b'-8) | | | | | | | | |
| Tanδ peak top shift value | ° C. | 7.3 | 6.2 | 7.5 | 4.5 | 7.2 | 3.9 | 7.5 |
| Size of islands to form disperse phase | | A | A | A | A | A | A | A |
| Tensile Shear Adhesion Strength | MPa | 1.7 | 2.5 | 2.5 | 2.5 | 2.5 | 1.9 | 2.5 |
| Morphology | | A | A | A | A | A | A | A |
| Young's Modulus | MPa | 320 | 240 | 225 | 249 | 232 | 272 | 216 |
| Low-temperature impact resistance (E', −25° C.) | MPa | 1980 | 1800 | 1770 | 1750 | 1810 | 2030 | 1650 |
| Low-temperature impact resistance (Tan δ, −25° C.) | | 0.066 | 0.084 | 0.083 | 0.075 | 0.082 | 0.068 | 0.068 |
| Bag-breakage strength (23° C.) | cm | 60 | 80 | 80 | 85 | 75 | 85 | 75 |
| Bag-breakage strength (4° C.) | cm | 22 | 28 | 28 | 30 | 30 | 24 | 28 |

| | | Example | | | | Comparative Example | | |
|---|---|---|---|---|---|---|---|---|
| | | 15 | 16 | 17 | 18 | 1 | 2 | 3 |
| (a) Polypropylene-based Resin (a-3) | part by mass | 70 | 70 | 70 | 70 | 70 | 70 | 70 |
| (b) Hydrogenated Block Copolymer (b-1) | part by mass | | 15 | | | | | |
| Hydrogenated Block Copolymer (b-2) | | | | 15 | | | | |
| Hydrogenated Block Copolymer (b-3) | | | | | | | | |
| Hydrogenated Block Copolymer (b-4) | | | | | | | | |
| Hydrogenated Block Copolymer (b-5) | | | | | | | | |
| Hydrogenated Block Copolymer (b-6) | | | | | | | | |
| Hydrogenated Block Copolymer (b-7) | | | | | | | | |
| Hydrogenated Block Copolymer (b-8) | | | | | | | | |
| Hydrogenated Block Copolymer (b-9) | | | | | | | | |
| Hydrogenated Block Copolymer (b-10) | | | | | | | | |
| Hydrogenated Block Copolymer (b-11) | | | | | | | | |
| Hydrogenated Block Copolymer (b-12) | | | | | | | | |
| Hydrogenated Block Copolymer (b-13) | | | | | | | | |
| Hydrogenated Block Copolymer (b-14) | | | | | | | | |
| Hydrogenated Block Copolymer (b-15) | | 30 | | | 15 | | | |
| (b') Hydrogenated Block Copolymer (b'-1) | part by mass | | 15 | 15 | | 30 | | |
| Hydrogenated Block Copolymer (b'-2) | | | | | | | 30 | |
| Hydrogenated Block Copolymer (b'-3) | | | | | 15 | | | 30 |
| Hydrogenated Block Copolymer (b'-4) | | | | | | | | |
| Hydrogenated Block Copolymer (b'-5) | | | | | | | | |
| Hydrogenated Block Copolymer (b'-6) | | | | | | | | |
| Hydrogenated Block Copolymer (b'-7) | | | | | | | | |
| Hydrogenated Block Copolymer (b'-8) | | | | | | | | |
| Tanδ peak top shift value | ° C. | 9.4 | 9.8 | 7.5 | 7.2 | 12.6 | not detected | 2.0 |

TABLE 4-continued

| Single-Layer Film | | | | | | | | |
|---|---|---|---|---|---|---|---|---|
| Size of islands to form disperse phase | | B | B | A | A | B | B | A |
| Tensile Shear Adhesion Strength | MPa | 2.5 | 2.5 | 2.5 | 2.5 | 2.5 | 2.5 | 1.4 |
| Morphology | | B | B | A | A | B | B | C |
| Young's Modulus | MPa | 163 | 195 | 233 | 252 | 140 | 249 | 384 |
| Low-temperature impact resistance (E', −25° C.) | MPa | 1620 | 1640 | 1790 | 1760 | 2180 | 2800 | 2300 |
| Low-temperature impact resistance (Tan δ, −25° C.) | | 0.118 | 0.102 | 0.097 | 0.103 | 0.063 | 0.036 | 0.037 |
| Bag-breakage strength (23° C.) | cm | 35 | 40 | 85 | 80 | 45 | 35 | 50 |
| Bag-breakage strength (4° C.) | cm | 40 | 34 | 28 | 35 | 12 | 8 | 10 |

| | | | Comparative Example | | | | | |
|---|---|---|---|---|---|---|---|---|
| | | | 4 | 5 | 6 | 7 | 8 | 9 |
| (a) Polypropylene-based Resin (a-3) | | part by mass | 70 | 70 | 70 | 70 | 70 | 70 |
| (b) Hydrogenated Block Copolymer (b-1) | | part by mass | | | | | | |
| Hydrogenated Block Copolymer (b-2) | | | | | | | | |
| Hydrogenated Block Copolymer (b-3) | | | | | | | | |
| Hydrogenated Block Copolymer (b-4) | | | | | | | | |
| Hydrogenated Block Copolymer (b-5) | | | | | | | | |
| Hydrogenated Block Copolymer (b-6) | | | | | | | | |
| Hydrogenated Block Copolymer (b-7) | | | | | | | | |
| Hydrogenated Block Copolymer (b-8) | | | | | | | | |
| Hydrogenated Block Copolymer (b-9) | | | | | | | | |
| Hydrogenated Block Copolymer (b-10) | | | | | | | | |
| Hydrogenated Block Copolymer (b-11) | | | | | | | | |
| Hydrogenated Block Copolymer (b-12) | | | | | | | | |
| Hydrogenated Block Copolymer (b-13) | | | | | | | | |
| Hydrogenated Block Copolymer (b-14) | | | | | | | | |
| Hydrogenated Block Copolymer (b-15) | | | | | | | | |
| (b') Hydrogenated Block Copolymer (b'-1) | | part by mass | | | | 15 | | |
| Hydrogenated Block Copolymer (b'-2) | | | | | | | | |
| Hydrogenated Block Copolymer (b'-3) | | | | | | 15 | | |
| Hydrogenated Block Copolymer (b'-4) | | | 30 | | | | | |
| Hydrogenated Block Copolymer (b'-5) | | | | 30 | | | | |
| Hydrogenated Block Copolymer (b'-6) | | | | | 30 | | | |
| Hydrogenated Block Copolymer (b'-7) | | | | | | | 30 | |
| Hydrogenated Block Copolymer (b'-8) | | | | | | | | 30 |
| Tanδ peak top shift value | ° C. | | 2.1 | 2.0 | 2.2 | 5.7 | 13 | 13 |
| Size of islands to form disperse phase | | | A | A | A | A | B | A |
| Tensile Shear Adhesion Strength | MPa | | 1.2 | 1.3 | 1.4 | 2.5 | 0.9 | 0.7 |
| Morphology | | | C | C | C | C | B | C |
| Young's Modulus | MPa | | 382 | 379 | 375 | 240 | 119 | 437 |
| Low-temperature impact resistance (E', −25° C.) | MPa | | 2340 | 2350 | 2210 | 1930 | 2100 | 3120 |
| Low-temperature impact resistance (Tan δ, −25° C.) | | | 0.035 | 0.034 | 0.039 | 0.063 | 0.068 | 0.020 |
| Bag-breakage strength (23° C.) | cm | | 50 | 50 | 50 | 80 | 15 | 15 |
| Bag-breakage strength (4° C.) | cm | | 10 | 10 | 11 | 20 | 10 | 5 |

The resin compositions obtained in Examples have high moldability, and from Table 4, it is known that the films of Examples satisfy both high flexibility and low-temperature impact resistance. Further, it can be said that the films of Examples are excellent in bag-breakage strength at room temperature and low temperature, and in particular, the bag-breakage strength at low temperature thereof is significantly improved.

The resin compositions obtained in Comparative Examples have high moldability, but it is known that the films of Comparative Examples are insufficient in point of at least one of flexibility and low-temperature impact resistance and are poor in bag-breakage strength, especially in bag-breakage strength at low temperature.

Examples 19 to 32, Comparative Examples 10 to 15: Production of Injection Sheet

All the components were premixed at the blending ratio shown in Table 5, and then fed into "ZSK26MC" (manufactured by COPERION Ltd., screw length (L)/screw diameter (D)=56), and melt-kneaded therein at a temperature of 200° C. to give pellets of a resin composition. Using an injection-molding machine "EC75SX" (manufactured by Toshiba Machine Co., Ltd.), the resin composition pellets obtained in each Example were injection-molded at a cylinder temperature of 200° C. to give a sheet having a length of 100 mm, a width of 35 mm and a thickness of 1 mm. The resultant injection sheet was evaluated and measured according to the methods mentioned above. The results are shown in Table 5.

TABLE 5

|  | Injection Sheet |  | Example 19 | 20 | 21 | 22 | 23 | 24 | 25 | 26 | 27 | 28 | 29 |
|---|---|---|---|---|---|---|---|---|---|---|---|---|---|
| (a) | Polypropylene-based resin (a-1) | part by mass | 80 | 80 | 80 | 80 | 80 | 80 | 80 | 80 | 80 | 80 | 80 |
| (b) | Hydrogenated Block Copolymer (b-1) | part by mass | 20 | | | | | | | | | | |
|  | Hydrogenated Block Copolymer (b-2) | | | 20 | | | | | | | | | |
|  | Hydrogenated Block Copolymer (b-3) | | | | 20 | | | | | | | | |
|  | Hydrogenated Block Copolymer (b-4) | | | | | 20 | | | | | | | |
|  | Hydrogenated Block Copolymer (b-5) | | | | | | 20 | | | | | | |
|  | Hydrogenated Block Copolymer (b-6) | | | | | | | 20 | | | | | |
|  | Hydrogenated Block Copolymer (b-7) | | | | | | | | 20 | | | | |
|  | Hydrogenated Block Copolymer (b-8) | | | | | | | | | 20 | | | |
|  | Hydrogenated Block Copolymer (b-9) | | | | | | | | | | 20 | | |
|  | Hydrogenated Block Copolymer (b-10) | | | | | | | | | | | 20 | |
|  | Hydrogenated Block Copolymer (b-11) | | | | | | | | | | | | 20 |
|  | Hydrogenated Block Copolymer (b-12) | | | | | | | | | | | | |
|  | Hydrogenated Block Copolymer (b-13) | | | | | | | | | | | | |
|  | Hydrogenated Block Copolymer (b-14) | | | | | | | | | | | | |
| (b') | Hydrogenated Block Copolymer (b'-1) | part by mass | | | | | | | | | | | |
|  | Hydrogenated Block Copolymer (b'-2) | | | | | | | | | | | | |
|  | Hydrogenated Block Copolymer (b'-3) | | | | | | | | | | | | |
|  | Hydrogenated Block Copolymer (b'-4) | | | | | | | | | | | | |
|  | Hydrogenated Block Copolymer (b'-5) | | | | | | | | | | | | |
|  | Hydrogenated Block Copolymer (b'-6) | | | | | | | | | | | | |
| Measurement Results | Tanδ peak top shift value | °C. | 7.3 | 4 | 3.2 | 6.5 | 3.8 | 6.7 | 7.5 | 7.2 | 6 | 7.2 | 4.3 |
|  | Size of islands to form disperse phase | | A | A | A | B | A | B | A | A | A | A | A |
|  | Tensile Shear Adhesion Strength | MPa | 2.4 | 2.1 | 1.9 | 2.4 | 1.9 | 2.2 | 2.4 | 2.8 | 2.4 | 2.4 | 2.4 |
|  | Heat Seal Strength (160° C.) | N/25 mm | 42 | 46 | 39 | 39 | 45 | 39 | 42 | 39 | 40 | 39 | 49 |

|  | Injection Sheet |  | Example 30 | 31 | 32 | Comparative Example 10 | 11 | 12 | 13 | 14 | 15 |
|---|---|---|---|---|---|---|---|---|---|---|---|
| (a) | Polypropylene-based resin (a-1) | part by mass | 80 | 80 | 80 | 80 | 80 | 80 | 80 | 80 | 80 |
| (b) | Hydrogenated Block Copolymer (b-1) | part by mass | | | | | | | | | |
|  | Hydrogenated Block Copolymer (b-2) | | | | | | | | | | |
|  | Hydrogenated Block Copolymer (b-3) | | | | | | | | | | |
|  | Hydrogenated Block Copolymer (b-4) | | | | | | | | | | |
|  | Hydrogenated Block Copolymer (b-5) | | | | | | | | | | |
|  | Hydrogenated Block Copolymer (b-6) | | | | | | | | | | |
|  | Hydrogenated Block Copolymer (b-7) | | | | | | | | | | |
|  | Hydrogenated Block Copolymer (b-8) | | | | | | | | | | |
|  | Hydrogenated Block Copolymer (b-9) | | | | | | | | | | |
|  | Hydrogenated Block Copolymer (b-10) | | | | | | | | | | |
|  | Hydrogenated Block Copolymer (b-11) | | | | | | | | | | |
|  | Hydrogenated Block Copolymer (b-12) | | 20 | | | | | | | | |
|  | Hydrogenated Block Copolymer (b-13) | | | 20 | | | | | | | |
|  | Hydrogenated Block Copolymer (b-14) | | | | 20 | | | | | | |
| (b') | Hydrogenated Block Copolymer (b'-1) | part by mass | | | | 20 | | | | | |
|  | Hydrogenated Block Copolymer (b'-2) | | | | | | 20 | | | | |
|  | Hydrogenated Block Copolymer (b'-3) | | | | | | | 20 | | | |
|  | Hydrogenated Block Copolymer (b'-4) | | | | | | | | 20 | | |
|  | Hydrogenated Block Copolymer (b'-5) | | | | | | | | | 20 | |
|  | Hydrogenated Block Copolymer (b'-6) | | | | | | | | | | 20 |
| Measurement Results | Tanδ peak top shift value | °C. | 7 | 3.7 | 7.3 | 12.2 | not detected | 1.8 | 1.9 | 1.9 | 2.1 |
|  | Size of islands to form disperse phase | | A | A | A | B | B | A | A | A | A |
|  | Tensile Shear Adhesion Strength | MPa | 2.4 | 2.0 | 2.4 | 2.4 | 2.4 | 1.4 | 1.2 | 1.3 | 1.4 |
|  | Heat Seal Strength (160° C.) | N/25 mm | 43 | 40 | 47 | 38 | 36 | 25 | 24 | 26 | 28 |

From Table 5, it is known that the injection sheets obtained in Examples have a high low-temperature (160° C.) heat seal strength. In particular, the low-temperature (160° C.) heat seal strength of the injection sheet of Example 29 using the hydrogenated block copolymer (b-11) having a high MFR and the injection sheet of Example 32 using the hydrogenated block copolymer (b-14) of a type "ABA+AB" was extremely high. From the above, it may be said that the resin composition of the present invention is useful as a port generally produced by injection molding.

On the other hand, the low-temperature (160° C.) heat seal strength of the injection sheets obtained in Comparative Examples is insufficient.

Examples 33 to 37, Comparative Examples 16 to 18: Production of Press Sheet

Using a batch mixer, the components were melt-kneaded at the blending ratio shown in Table 6 to prepare a resin composition. Next, using a mold having a thickness of 1 mm, the resin composition was press-molded at 200° C. for 6 minutes, and then, using a cooling press, this was cooled at 10° C. to give a press sheet having a thickness of 1 mm.

The resultant press sheet was evaluated and measured according to the methods mentioned above. The results are shown in Table 6.

TABLE 6

|  | Press Sheet |  | Example | | | | | Comparative Example | | |
|---|---|---|---|---|---|---|---|---|---|---|
|  |  |  | 33 | 34 | 35 | 36 | 37 | 16 | 17 | 18 |
| (a) | Polypropylene-based resin (a-1) | part by mass | 80 | 80 | 80 | 80 | 80 | 80 | 80 | 80 |
| (b) | Hydrogenated Block Copolymer (b-1) | part by mass | 20 | | | | | | | |
|  | Hydrogenated Block Copolymer (b-2) | | | 20 | | | | | | |
|  | Hydrogenated Block Copolymer (b-3) | | | | 20 | | | | | |
|  | Hydrogenated Block Copolymer (b-4) | | | | | | | | | |
|  | Hydrogenated Block Copolymer (b-5) | | | | | | | | | |
|  | Hydrogenated Block Copolymer (b-6) | | | | | | | | | |
|  | Hydrogenated Block Copolymer (b-7) | | | | | | | | | |
|  | Hydrogenated Block Copolymer (b-8) | | | | | | | | | |
|  | Hydrogenated Block Copolymer (b-9) | | | | | | | | | |
|  | Hydrogenated Block Copolymer (b-10) | | | | | | | | | |
|  | Hydrogenated Block Copolymer (b-11) | | | | | 20 | | | | |
|  | Hydrogenated Block Copolymer (b-12) | | | | | | | | | |
|  | Hydrogenated Block Copolymer (b-13) | | | | | | | | | |
|  | Hydrogenated Block Copolymer (b-14) | | | | | | 20 | | | |
| (b') | Hydrogenated Block Copolymer (b'-1) | part by mass | | | | | | 20 | | |
|  | Hydrogenated Block Copolymer (b'-2) | | | | | | | | 20 | |
|  | Hydrogenated Block Copolymer (b'-3) | | | | | | | | | 20 |
|  | Hydrogenated Block Copolymer (b'-4) | | | | | | | | | |
|  | Hydrogenated Block Copolymer (b'-5) | | | | | | | | | |
| Measurement Results | Tanδ peak top shift value | ° C. | 7.3 | 4 | 3.2 | 4.3 | 7.3 | 12.2 | not detected | 1.8 |
|  | Size of islands to form disperse phase |  | A | A | A | A | A | B | B | A |
|  | Tensile Shear Adhesion Strength | MPa | 2.4 | 2.1 | 1.9 | 2.4 | 2.4 | 2.4 | 2.4 | 1.4 |
|  | Heat Seal Strength (150° C.) | N/25 mm | 59 | 46 | 39 | 68 | 61 | 35 | 30 | 22 |
|  | Heat Seal Strength (160° C.) | N/25 mm | 71 | 72 | 67 | 75 | 74 | 65 | 58 | 44 |

From Table 6, it is known that the press sheets obtained in Examples have a high low-temperature (150° C. or 160° C.) heat seal strength. In particular, the low-temperature (150° C. or 160° C.) heat seal strength of the press sheet of Example 36 using the hydrogenated block copolymer (b-11) having a high MFR was extremely high.

On the other hand, the low-temperature (150° C. or 160° C.) heat seal strength of the press sheets obtained in Comparative Examples is low, and in particular, it is known that the heat seal strength thereof at 150° C. is extremely low.

Examples 38 to 52, Comparative Examples 19 to 21: Production of Laminate (Three-Layer Film)

The materials shown in Table 7 were used. The materials for the inner layer, the materials for the middle layer, and the materials for the outer layer were separately blended in the blending ratio shown in Table 7, and using a water-cooling downward inflation molding machine under the condition of a resin temperature of 200° C., a cooling water temperature of 20° C. and a line speed of 10 m/min, these were molded to give a three-layer laminate (film for liquid-packaging container) having a thickness of 200 μm. Regarding the thickness of each layer, the inner layer was 20 μm, the middle layer was 130 μm and the outer layer was 50 μm. The resultant film was evaluated and measured according to the methods mentioned above. The results are shown in Table 7.

TABLE 7

| Three-Layer Film | | | | Example | | | | | |
|---|---|---|---|---|---|---|---|---|---|
|  |  |  |  | 38 | 39 | 40 | 41 | 42 | 43 |
| Outer Layer | Polypropylene-based Resin (a-2) | part by mass | | 95 | 95 | 95 | 95 | 95 | 95 |
|  | Hydrogenated Block Copolymer (b-3) | part by mass | | | | | | | |
|  | Hydrogenated Block Copolymer (b'-1) | part by mass | | 5 | 5 | 5 | 5 | 5 | 5 |
|  | Thickness | μm | | 50 | 50 | 50 | 50 | 50 | 50 |

TABLE 7-continued

| | | Three-Layer Film | | | | | | | |
|---|---|---|---|---|---|---|---|---|---|
| Middle Layer | Polypropylene-based Resin (a-3) | part by mass | 70 | 70 | 70 | 70 | 70 | 70 |
| | Hydrogenated Block Copolymer (b-1) | part by mass | 30 | | | 30 | 30 | 30 |
| | Hydrogenated Block Copolymer (b-2) | part by mass | | 30 | | | | 30 |
| | Hydrogenated Block Copolymer (b-3) | part by mass | | | | | | |
| | Hydrogenated Block Copolymer (b-7) | part by mass | | | | | | |
| | Hydrogenated Block Copolymer (b-15) | part by mass | | | | | | |
| | Hydrogenated Block Copolymer (b'-1) | part by mass | | | | | | |
| | Hydrogenated Block Copolymer (b'-3) | part by mass | | | | | | |
| | Ethylene-α-olefin Copolymer (c-1) | part by mass | | | | | | |
| | Thickness | μm | 130 | 130 | 130 | 130 | 130 | 130 |
| Inner Layer | Polypropylene-based Resin (a-4) | part by mass | 70 | 70 | 70 | 70 | 70 | 70 |
| | Hydrogenated Block Copolymer (b-1) | part by mass | | | 30 | | | |
| | Hydrogenated Block Copolymer (b-2) | part by mass | | | | 30 | | |
| | Hydrogenated Block Copolymer (b-3) | part by mass | | | | | | |
| | Hydrogenated Block Copolymer (b'-1) | part by mass | 30 | 30 | | | | |
| | Hydrogenated Block Copolymer (b'-3) | part by mass | | | | | 30 | 30 |
| | Thickness | μm | 20 | 20 | 20 | 20 | 20 | 20 |
| Measurement Results | Middle Layer | Tanδ peak top shift value | ° C. | 7.5 | 4.2 | 7.5 | 7.5 | 7.5 | 4.2 |
| | | Size of islands to form disperse phase | | A | A | A | A | A | A |
| | | Tensile Shear Adhesion Strength | MPa | 2.5 | 2.0 | 2.5 | 2.5 | 2.5 | 2.0 |
| | | Mophology | | A | A | A | A | A | A |
| | Inner Layer | Tanδ peak top shift value | ° C. | 12.6 | 12.6 | 7.5 | 4.2 | 2.1 | 2.1 |
| | | Size of islands to form disperse phase | | B | B | A | A | A | A |
| | | Tensile Shear Adhesion Strength | MPa | 2.4 | 2.4 | 2.4 | 2.1 | 1.4 | 1.4 |
| | | Morphology | | B | B | A | A | C | C |
| | Young's Modulus | | MPa | 260 | 310 | 260 | 265 | 270 | 320 |
| | Bag-Breakage Strength (23° C.) | | cm | 100 | 90 | 130 | >150 | >150 | 120 |
| | Bag-Breakage Strength (4° C.) | | cm | 55 | 50 | 65 | 70 | 60 | 55 |

| | | | | Example | | | | | |
|---|---|---|---|---|---|---|---|---|---|
| | | | | 44 | 45 | 46 | 47 | 48 | 49 |
| Outer Layer | Polypropylene-based Resin (a-2) | part by mass | | 95 | 95 | 95 | 95 | 95 | 95 |
| | Hydrogenated Block Copolymer (b-3) | part by mass | | | | | | | |
| | Hydrogenated Block Copolymer (b'-1) | part by mass | | 5 | 5 | 5 | 5 | 5 | 5 |
| | Thickness | μm | | 50 | 50 | 50 | 50 | 50 | 50 |
| Middle Layer | Polypropylene-based Resin (a-3) | part by mass | | 70 | 70 | 70 | 60 | 70 | 70 |
| | Hydrogenated Block Copolymer (b-1) | part by mass | | | | | | | |
| | Hydrogenated Block Copolymer (b-2) | part by mass | | | | | | | |
| | Hydrogenated Block Copolymer (b-3) | part by mass | | | | | | | 15 |
| | Hydrogenated Block Copolymer (b-7) | part by mass | | 30 | | | | | |
| | Hydrogenated Block Copolymer (b-15) | part by mass | | | 30 | | | | |
| | Hydrogenated Block Copolymer (b'-1) | part by mass | | | | 30 | 30 | 30 | 15 |
| | Hydrogenated Block Copolymer (b'-3) | part by mass | | | | | | | |
| | Ethylene-α-olefin Copolymer (c-1) | part by mass | | | | | | | |
| | Thickness | μm | | 130 | 130 | 130 | 130 | 130 | 130 |
| Inner Layer | Polypropylene-based Resin (a-4) | part by mass | | 70 | 70 | 70 | 70 | 70 | 70 |
| | Hydrogenated Block Copolymer (b-1) | part by mass | | | | 30 | | | |
| | Hydrogenated Block Copolymer (b-2) | part by mass | | | | | 30 | | |
| | Hydrogenated Block Copolymer (b-3) | part by mass | | | | | | 30 | 30 |
| | Hydrogenated Block Copolymer (b'-1) | part by mass | | | | | | | |
| | Hydrogenated Block Copolymer (b'-3) | part by mass | | 30 | 30 | | | | |
| | Thickness | μm | | 20 | 20 | 20 | 20 | 20 | 20 |
| Measurement Results | Middle Layer | Tanδ peak top shift value | ° C. | 7.7 | 9.4 | 12.6 | 12.6 | 12.6 | 6.9 |
| | | Size of islands to form disperse phase | | A | A | B | B | B | A |
| | | Tensile Shear Adhesion Strength | MPa | 2.5 | 2.5 | 2.5 | 2.5 | 2.5 | 2.5 |
| | | Mophology | | A | B | B | B | B | A |
| | Inner Layer | Tanδ peak top shift value | ° C. | 2.1 | 2.1 | 7.5 | 4.2 | 3.5 | 3.5 |
| | | Size of islands to form disperse phase | | A | A | A | A | A | A |
| | | Tensile Shear Adhesion Strength | MPa | 1.4 | 1.4 | 2.4 | 2.1 | 1.9 | 1.9 |
| | | Morphology | | C | C | A | A | A | A |
| | Young's Modulus | | MPa | 220 | 185 | 180 | 185 | 185 | 255 |
| | Bag-Breakage Strength (23° C.) | | cm | >150 | >150 | 110 | >150 | >150 | >150 |
| | Bag-Breakage Strength (4° C.) | | cm | 75 | 80 | 35 | 30 | 40 | 60 |

| | | | | Example | | | Comparative Example | | |
|---|---|---|---|---|---|---|---|---|---|
| | | | | 50 | 51 | 52 | 19 | 20 | 21 |
| Outer Layer | Polypropylene-based Resin (a-2) | part by mass | | 95 | 70 | 95 | 95 | 95 | 95 |
| | Hydrogenated Block Copolymer (b-3) | part by mass | | | 30 | | | | |
| | Hydrogenated Block Copolymer (b'-1) | part by mass | | 5 | | 5 | 5 | 5 | 5 |
| | Thickness | μm | | 50 | 50 | 50 | 50 | 50 | 50 |
| Middle Layer | Polypropylene-based Resin (a-3) | part by mass | | 70 | 70 | 60 | 70 | 70 | 70 |
| | Hydrogenated Block Copolymer (b-1) | part by mass | | | | | | | |
| | Hydrogenated Block Copolymer (b-2) | part by mass | | | | | | | |

TABLE 7-continued

| | | | | Three-Layer Film | | | | | |
|---|---|---|---|---|---|---|---|---|---|
| | | Hydrogenated Block Copolymer (b-3) | part by mass | 15 | 15 | 15 | | | |
| | | Hydrogenated Block Copolymer (b-7) | part by mass | | | | | | |
| | | Hydrogenated Block Copolymer (b-15) | part by mass | | | | | | |
| | | Hydrogenated Block Copolymer (b'-1) | part by mass | 15 | 15 | 15 | 30 | 30 | |
| | | Hydrogenated Block Copolymer (b'-3) | part by mass | | | | | | 30 |
| | | Ethylene-α-olefin Copolymer (c-1) | part by mass | | | 10 | | | |
| | | Thickness | μm | 130 | 130 | 130 | 130 | 130 | 130 |
| Inner | | Polypropylene-based Resin (a-4) | part by mass | 70 | 70 | 70 | 70 | 70 | 70 |
| Layer | | Hydrogenated Block Copolymer (b-1) | part by mass | | | | | | |
| | | Hydrogenated Block Copolymer (b-2) | part by mass | | | | | | |
| | | Hydrogenated Block Copolymer (b-3) | part by mass | | | 30 | 30 | | |
| | | Hydrogenated Block Copolymer (b'-1) | part by mass | | | | | 30 | |
| | | Hydrogenated Block Copolymer (b'-3) | part by mass | 30 | | | | 30 | |
| | | Thickness | μm | 20 | 20 | 20 | 20 | 20 | 20 |
| Measurement | Middle | Tanδ peak top shift value | °C. | 6.9 | 6.9 | 6.9 | 12.6 | 12.6 | 2.0 |
| Results | Layer | Size of islands to form disperse phase | | A | A | A | B | B | A |
| | | Tensile Shear Adhesion Strength | MPa | 2.5 | 2.5 | 2.5 | 2.5 | 2.5 | 1.4 |
| | | Morphology | | A | A | A | B | B | C |
| | Inner | Tanδ peak top shift value | °C. | 2.1 | 3.5 | 3.5 | 12.6 | 2.1 | 12.6 |
| | Layer | Size of islands to form disperse phase | | A | A | A | B | A | B |
| | | Tensile Shear Adhesion Strength | MPa | 1.4 | 1.9 | 1.9 | 2.4 | 1.4 | 2.4 |
| | | Morphology | | C | A | A | B | C | B |
| | | Young's Modulus | MPa | 185 | 240 | 230 | 180 | 190 | 420 |
| | | Bag-Breakage Strength (23° C.) | cm | <150 | <150 | <150 | 21 | <150 | 45 |
| | | Bag-Breakage Strength (4° C.) | cm | 75 | 85 | 85 | 12 | 18 | 8 |

From Table 7, it is known that the three-layer films obtained in Examples are excellent in flexibility and have a high bag-breakage strength, especially a high bag-breakage strength at low temperature.

On the other hand, the bag-breakage strength of the three-layer film obtained in Comparative Example 19 is low at both room temperature and low temperature. The bag-breakage strength of the three-layer film obtained in Comparative Example 20 is low at low temperature. The three-layer film obtained in Comparative Example 21 is poor in flexibility, and the bag-breakage strength thereof is low at both room temperature and low temperature.

INDUSTRIAL APPLICABILITY

The liquid-packaging container of the present invention can be used in various uses. For example, it can be effectively used for the above-mentioned medical containers and additionally also for food-packaging containers for packaging retort food, mayonnaise, ketchup, refreshing drink, ice, etc.

REFERENCE SIGNS LIST

1. Polypropylene-Based Resin (a)
2. Hydrogenated Block Copolymer (b) or (b')

The invention claimed is:

1. A film for liquid-packaging container comprising a resin composition comprising a polypropylene-based resin (a) and a hydrogenated block copolymer (b), wherein:
   the polypropylene-based resin (a) forms a continuous phase and the hydrogenated block copolymer (b) forms an island-like disperse phase, and in the islands that form the disperse phase, there exist islands having a length in the major axis direction of 500 nm or more;
   the hydrogenated block copolymer (b) is a hydrogenation product of a block copolymer comprising a polymer block (A) mainly containing a structural unit derived from an aromatic vinyl compound and a polymer block (B) mainly containing a structural unit derived from isoprene, a structural unit derived from butadiene, or a structural unit derived from a mixture of isoprene and butadiene, wherein the content of the polymer block (A) in the hydrogenated block copolymer (b) is from 3 to 35% by mass,
   the glass transition temperature of the hydrogenated block copolymer (b) is −50 to −35° C., and
   the tensile shear adhesion strength, as obtained by a measurement according to JIS K 6850 (1999) where the polypropylene-based resin (a) is an adherend and the hydrogenated block copolymer (b) is an adhesive layer, is 1.0 MPa or more.

2. The film for liquid-packaging container according to claim 1, which satisfies the following expression (1):

$$2.5° C. \leq |tp(a)-tp(ab)| \leq 12° C. \tag{1}$$

wherein:
   tp(a) represents a tan δ peak top temperature (° C.) derived from a polypropylene-based resin (a) in the case of the polypropylene-based resin (a) alone, and
   tp(ab) represents a tan δ peak top temperature (° C.) derived from a polypropylene-based resin (a) in the case of the resin composition of the polypropylene-based resin (a) and the hydrogenated block copolymer (b) only as kneaded in a ratio (by mass) of polypropylene-based resin (a)/hydrogenated block copolymer (b)=70/30.

3. The film for liquid-packaging container according to claim 1, wherein the content ratio of the polypropylene-based resin (a) relative to the total of the polypropylene-based resin (a) and the hydrogenated block copolymer (b) [(a)/{(a)+(b)}] (by mass) is 50/100 to 95/100.

4. The resin composition according to claim 1, wherein the resin composition further comprising a hydrogenated block copolymer (b') which is a hydrogenation product of a block copolymer comprising a polymer block (A') that mainly contains a structural unit derived from an aromatic vinyl compound, and a polymer block (B') that mainly contains a structural unit derived from isoprene, a structural unit derived from butadiene or a structural unit derived from a mixture of isoprene and butadiene, and which has a glass transition temperature of −60° C. or higher and lower than −50° C., or higher than −35° C. and −5° C. or lower.

5. The film for liquid-packaging container according to claim 1, wherein the hydrogenation rate of the hydrogenated block copolymer (b) is 80 mol % or more.

6. The film for liquid-packaging container according to claim 1, wherein the weight average molecular weight of the hydrogenated block copolymer (b) is from 20,000 to 500,000.

7. The film for liquid-packaging container according to claim 1, wherein the polymer block (B) mainly contains a structural unit derived from butadiene, or a structural unit derived from a mixture of isoprene and butadiene.

8. The film for liquid-packaging container according to claim 1, wherein the polypropylene-based resin (a) comprises a propylene-derived structural unit in an amount of 60 mol % or more, and has a melt flow rate at 230° C. and under the condition of a load 21.6 N of 0.1 to 70 g/10 min.

9. The film for liquid-packaging container according to claim 1, wherein the polypropylene-based resin (a) is at least one selected from the group consisting of a homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and denatured derivatives thereof.

10. The film for liquid-packaging container according to claim 1, wherein the resin composition has a Young's modulus of 650 MPa or less.

11. A heat sealing agent, comprising the film for liquid-packaging container of claim 1.

12. A liquid-packaging container, which is formed of the film for liquid-packaging container of claim 1.

13. A liquid-packaging container, comprising a laminate of two or more layers having an inner layer and an outer layer, wherein:
the inner layer comprises the film for liquid-packaging container of claim 1, and
the outer layer comprises a resin composition (Y) comprising a polypropylene-based resin having a propylene-derived structural unit content of 60 mol % or more, in an amount of 55% by mass or more.

14. A liquid-packaging container, comprising a laminate of three or more layers having a middle layer between an inner layer and an outer layer, wherein:
at least one selected from the group consisting of the inner layer and the middle layer comprises the film for liquid-packaging container of claim 1, and
the outer layer comprises a resin composition (Y) comprising a polypropylene-based resin having a propylene-derived structural unit content of 60 mol % or more, in an amount of 55% by mass or more.

15. A liquid-packaging container, comprising a laminate of two or more layers having an inner layer and an outer layer, wherein at least one selected C from the group consisting of the inner layer and the outer layer comprises the film for liquid-packaging container of claim 1.

16. A liquid-packaging container, comprising a laminate of three or more layers having a middle layer between an inner layer and an outer layer, wherein the outer layer comprises the film for liquid-packaging container of claim 1.

17. The liquid-packaging container according to claim 13, wherein the resin composition (Y) comprises a hydrogenated block copolymer (b') which is a hydrogenation product of a block copolymer containing a polymer block (A') that mainly contains a structural unit derived from an aromatic vinyl compound, and a polymer block (B') that mainly contains a structural unit derived from isoprene, a structural unit derived from butadiene or a structural unit derived from a mixture of isoprene and butadiene, and which has a glass transition temperature of −60° C. or higher and lower than −50° C., or higher than −35° C. and −5° C. or lower.

18. The liquid-packaging container according to claim 14, wherein the thickness of each layer is from 5 to 50 μm for the inner layer, from 100 to 300 μm for the middle layer and from 10 to 120 μm for the outer layer.

19. A liquid discharge member, comprising the film for liquid-packaging container of claim 1.

20. The liquid-packaging container according to claim 12, which is equipped with a liquid discharge member comprising a resin composition,
wherein:
the resin composition comprises a polypropylene-based resin (a) and a hydrogenated block copolymer (b),
the hydrogenated block copolymer (b) is a hydrogenation product of a block copolymer containing a polymer block (A) mainly containing a structural unit derived from an aromatic vinyl compound and a polymer block (B) mainly containing a structural unit derived from isoprene, a structural unit derived from butadiene, or a structural unit derived from a mixture of isoprene and butadiene,
the glass transition temperature of the hydrogenated block copolymer (b) is −50 to −35° C., and
the tensile shear adhesion strength, as obtained by a measurement according to JIS K 6850 (1999) where the polypropylene-based resin (a) is an adherend and the hydrogenated block copolymer (b) is an adhesive layer, is 1.0 MPa or more.

21. A medical container, comprising the liquid-packaging container of claim 12.

* * * * *